United States Patent [19]

Nakashima et al.

[11] Patent Number: 5,280,707
[45] Date of Patent: Jan. 25, 1994

[54] APPARATUS FOR DETECTING DETERIORATION OF CATALYST

[75] Inventors: Akihiro Nakashima, Chiryu; Toshiaki Mizuno, Kariya, both of Japan

[73] Assignee: Nippondenso Co., Ltd., Kariya, Japan

[21] Appl. No.: 977,515

[22] Filed: Nov. 17, 1992

[30] Foreign Application Priority Data

Nov. 18, 1991 [JP] Japan .................................. 3-301892
Aug. 20, 1992 [JP] Japan .................................. 4-221353

[51] Int. Cl.$^5$ ............................................. F01N 3/20
[52] U.S. Cl. ....................................... 60/276; 60/277; 60/285
[58] Field of Search .......................... 60/276, 277, 285

[56] References Cited

U.S. PATENT DOCUMENTS 5,154,055 10/1992 Nakane et al. .................... 60/276
5,220,788 6/1993 Kurita et al. ...................... 60/274

FOREIGN PATENT DOCUMENTS 2-207159 8/1990 Japan .
2-310453 12/1990 Japan .

Primary Examiner—Noah P. Kamen
Attorney, Agent, or Firm—Cushman, Darby & Cushman

[57] ABSTRACT

A catalyst deterioration detection apparatus having oxygen sensors disposed in the upper stream and the lower stream from a ternary catalyst disposed in the exhaust system of an internal combustion engine, controlling so as to make the air/fuel ratio of the internal combustion engine to be in the neighborhood of a theoretical air/fuel ratio in response to an output signal from at least either of the oxygen sensors, detecting a response delay time from a moment an output signal from the upper stream oxygen sensor has been changed to a moment an output signal from the lower stream oxygen sensor has been changed when the air/fuel ratio of the internal combustion engine is changed from the rich side to the lean side or from the lean side to the rich side, and discrimination that the catalyst has deteriorated if the response delay time is shorter than a predetermined value, the catalyst deterioration detection apparatus including a device for permitting the catalyst deterioration detection apparatus to perform the detection operation if a fact that the internal combustion engine is in a predetermined operation state has been detected and a fact that the air/fuel ration has been converged to the neighborhood of the theoretical air/fuel ratio has been detected.

12 Claims, 14 Drawing Sheets

PERIOD OF LOWER STREAM O₂ SENSOR

APPARATUS FOR DETECTING DETERIORATION OF CATALYST

BACKGROUND OF THE INVENTION

1. Field of the Invention

The present invention relates to an apparatus for detecting deterioration of a catalyst disposed in a exhaust system of an engine and acting to purify an exhaust gas.

2. Related Art Statement

Hitherto, there has been a system having oxygen sensors in the upper and the lower streams of a catalyst. A system of the type described above compensates, by means of an output signal from a lower stream oxygen sensor thereof, scattering of output signals of the upper stream oxygen sensor due to, for example, a change with the passage of time. The output signal from the lower stream oxygen sensor is, due to the characteristics thereof, changed in a period longer than that of the output signal from the upper stream oxygen sensor because of the storage effect of the catalyst.

However, the storage effect degrades if the catalyst deteriorates and unburnt gases such as HC, CO, NOx gases are introduced into the lower stream of the catalyst, causing the period of the output signal from the lower stream oxygen sensor to be shortened (the delay time to be shortened) to a period which is substantially the same as the period of the output signal from the upper stream oxygen sensor. Furthermore, the amplitude of the output signal from the lower stream oxygen sensor becomes enlarged in comparison to that realized when the catalyst is in the normal state.

Accordingly, an apparatus for detecting deterioration of a catalyst has been known which is adapted to a method arranged in such a manner that the period ratio {(the period of the upper stream sensor)/(the period of the lower stream sensor)} the output signals from the upper and the lower stream oxygen sensors is obtained so as to discriminate that the catalyst has deteriorated if the aforesaid period ratio becomes smaller than a predetermined value or if the amplitude of the output signal from the lower stream oxygen sensor has exceeded a reference value (refer to, for example, U.S. Pat. No. 4,739,614).

Another method has been disclosed in Japanese Patent Laid-Open No. 2-207159 in which the discrimination of the deterioration of the catalyst is commenced if conditions for discriminating deterioration of a catalyst are satisfied, that is, under the conditions that warming up of the engine has been sufficiently performed and the catalyst has been satisfactorily warmed because the temperature of water for cooling the internal combustion engine is included by a predetermined range, the load is included by a predetermined range, a predetermined time has passed after the engine had been started, and the idle switch is switched on. In this method, the deterioration of the catalyst is detected in such a manner that the air/fuel ratio of the internal combustion engine is forcibly switched from a rich state to a lean state, and a discrimination is made that the catalyst has deteriorated if the time taken from the moment the air/fuel ratio has been forcibly switched from the rich state to the lean state to a moment the output from the lower stream oxygen sensor has been switched from the rich state to the lean state is shorter than a predetermined time.

However, the aforesaid conventional method has a problem that the detection of the deterioration of the catalyst cannot be performed accurately because th catalyst deterioration discriminating process is performed although the air/fuel ratio of the internal combustion engine is not converged to the neighborhood of a theoretical air/fuel ratio due to its basic structure in which the catalyst deterioration discriminating process is performed if the engine operation state, that warming up of the engine has been performed sufficiently and that the catalyst has been warmed up satisfactorily, is satisfied.

SUMMARY OF THE INVENTION

Accordingly, an object of the present invention is to correctly detect deterioration of a catalyst by discriminating the deterioration of the catalyst when the air/fuel ratio of an internal combustion engine is converged to the neighborhood of a theoretical air/fuel ratio.

The present invention employs technical means characterized by an apparatus for detecting deterioration of a catalyst disposed in an exhaust system of a internal combustion engine and acting to purify an exhaust gas, the apparatus for detecting deterioration of a catalyst comprising: upper and lower stream oxygen sensors respectively disposed in the upper stream and the lower stream from the catalyst and acting to detect whether or not the air/fuel ratio of the internal combustion engine is rich or lean with respect to a theoretical air/fuel ratio; air/fuel ratio calculating means for calculating, in accordance with an output signal from the upper and/or lower stream oxygen sensors, an air/fuel ratio correction coefficient with which the air/fuel ratio is corrected so as to be in the neighborhood of the theoretical air/fuel ratio; internal engine control means for performing control by using the air/fuel ratio correction coefficient in such a manner that the air/fuel ratio is made to be the theoretical air/fuel ratio; average air/fuel ratio correction coefficient calculating means for calculating an average air/fuel ratio correction coefficient of the air/fuel ratio correction coefficient when the air/fuel ratio is changed from a rich side to a lean side and the air/fuel ratio correction coefficient when the air/fuel ratio is changed from the leans side to the rich side; catalyst deterioration detection means for discriminating the deterioration of the catalyst in accordance with an output signal from at least the lower stream oxygen sensor; and permission means for permitting the catalyst deterioration detection means to execute the detection if a fact that the internal combustion engine is in a predetermined operation state has been detected and if a fact that the air/fuel ratio has been converged to the neighborhood of the theoretical air/fuel ratio has been detected in accordance with the value of the average air/fuel ratio correction coefficient.

According to the present invention, another technical means may be employed which is characterized by an apparatus for detecting deterioration of a catalyst disposed in an exhaust system of an internal combustion engine and acting to purify an exhaust gas, the apparatus for detecting deterioration of a catalyst comprising: upper and lower stream oxygen sensors respectively disposed in the upper stream and the lower stream from the catalyst and acting to detect whether or not the air/fuel ratio of the internal combustion engine is rich or lean with respect to a theoretical air/fuel ratio; air/fuel ratio calculating means for calculating, in accordance with an output signal from the upper and/or lower stream oxygen sensors, an air/fuel ratio correction coefficient with which the air/fuel ratio is corrected so to be in the neighborhood of the theoretical air/fuel ratio; internal engine control means for performing control by using the air/fuel ratio correction coefficient in such a manner that the air/fuel ratio is made to be the theoretical air/fuel ratio; average air/fuel ratio correction coefficient calculating means for calculating an average air/fuel ratio correction coefficient of the air/fuel ratio correction coefficient when the air/fuel ratio is changed from a rich side to a lean side and the air/fuel ratio correction coefficient when the air/fuel ratio is changed from the lean side to the rich side; forcible control means for forcibly controlling the air/fuel ratio of the internal combustion engine to forcibly repeat the rich state and the lean state at predetermined intervals; catalyst deterioration detection means for detecting, during a forcible control performed by the forcible control mean, a response delay time from a moment an output signal from the upper stream oxygen sensor has been changed to a moment an output signal from the lower stream oxygen sensor has been changed, the catalyst deterioration detection means being arranged to discriminate that the catalyst has deteriorated if the response delay time is shorter than a predetermined value; and permission means for permitting the forcible control means to perform control if a fact that the internal combustion engine is in an idle state has been detected and a fact that the air/fuel ratio has been converged to the neighborhood of the theoretical air/fuel ratio has been detected in accordance with the value of the average air/fuel ratio correction coefficient.

The catalyst may be directly connected to the exhaust manifold of the exhaust system.

As a result of the aforesaid structure, the air/fuel ratio correction coefficient calculating means calculates the air/fuel ratio correction coefficient so as to make the air/fuel ratio of a mixed gas, to be supplied to the engine, to be in the neighborhood of the theoretical air/fuel ratio in accordance with output signals from the upper and the lower stream oxygen sensors disposed in the upper and the lower streams of the catalyst which is disposed in the exhaust system of the internal combustion engine and which acts to purify the exhaust gas. Furthermore, the internal combustion engine control means uses the air/fuel ratio correction coefficient to control the air/fuel ratio of the mixed gas, to be supplied to the engine, to be in the neighborhood of the theoretical air/fuel ratio. If th idle detection means discriminates that the internal combustion engine is in the idle state, the response delay time taken from the moment the output signal from the upper stream oxygen sensor has been changed to the moment the output signal from the lower stream oxygen sensor has been changed is detected. If the response delay time is shorter than a predetermined value, a discrimination is made that the catalyst has deteriorated.

Another structure may be employed which is arranged in such a manner that, if the idle detection means has discriminated that the internal combustion engine is in the idle state, the internal combustion engine forcible control means forcibly controls the internal combustion engine in such a manner that the air/fuel ratio of the internal combustion engine repeats the rich state and the lean state at a predetermined interval, and the response delay time taken from the moment the output signal from the upper stream oxygen sensor has been changed to the moment the output signal from the lower stream oxygen sensor has been changed or the response delay time from the moment the control of the internal combustion engine has been changed by the internal combustion engine forcible control means to the moment the output signal from the lower stream oxygen sensor has been changed is detected. If the response delay time is shorter than a predetermined value, a discrimination is made that the catalyst has deteriorated.

By directly connecting the catalyst to the exhaust manifold, the catalyst can be heated to the activation temperature. Therefore, the detection of deterioration of the catalyst can be assuredly performed at the time of idling.

The average air/fuel ratio control means calculates the average air/fuel ratio correction coefficient of the air/fuel ratio correction coefficient when the air/fuel ratio of the mixed gas is changed from the rich side to the lean side and the air/fuel ratio correction coefficient when the same is changed from the lean side to the rich side, and the air/fuel ratio of the mixed gas is controlled to be in the neighborhood of the theoretical air/fuel ratio by using the average air/fuel ratio correction coefficient. The permission mean permits the catalyst deterioration detection means to perform the deterioration detection operation if the air/fuel ratio of the mixed gas has been converged to the neighborhood of the theoretical air/fuel ratio. As a result, the mixed gas can be assuredly controlled to the neighborhood of the theoretical air/fuel ratio. By performing the catalyst deterioration detection at this time, whether or not the catalyst has deteriorated can accurately be detected.

Other and further objects, features and advantages of the invention will be appear more fully from the following description.

DESCRIPTION OF THE PREFERRED EMBODIMENTS

An embodiment arranged by adapting the present invention to an internal combustion engine for a vehicle will now be described with reference to the drawings.

Figure 1:
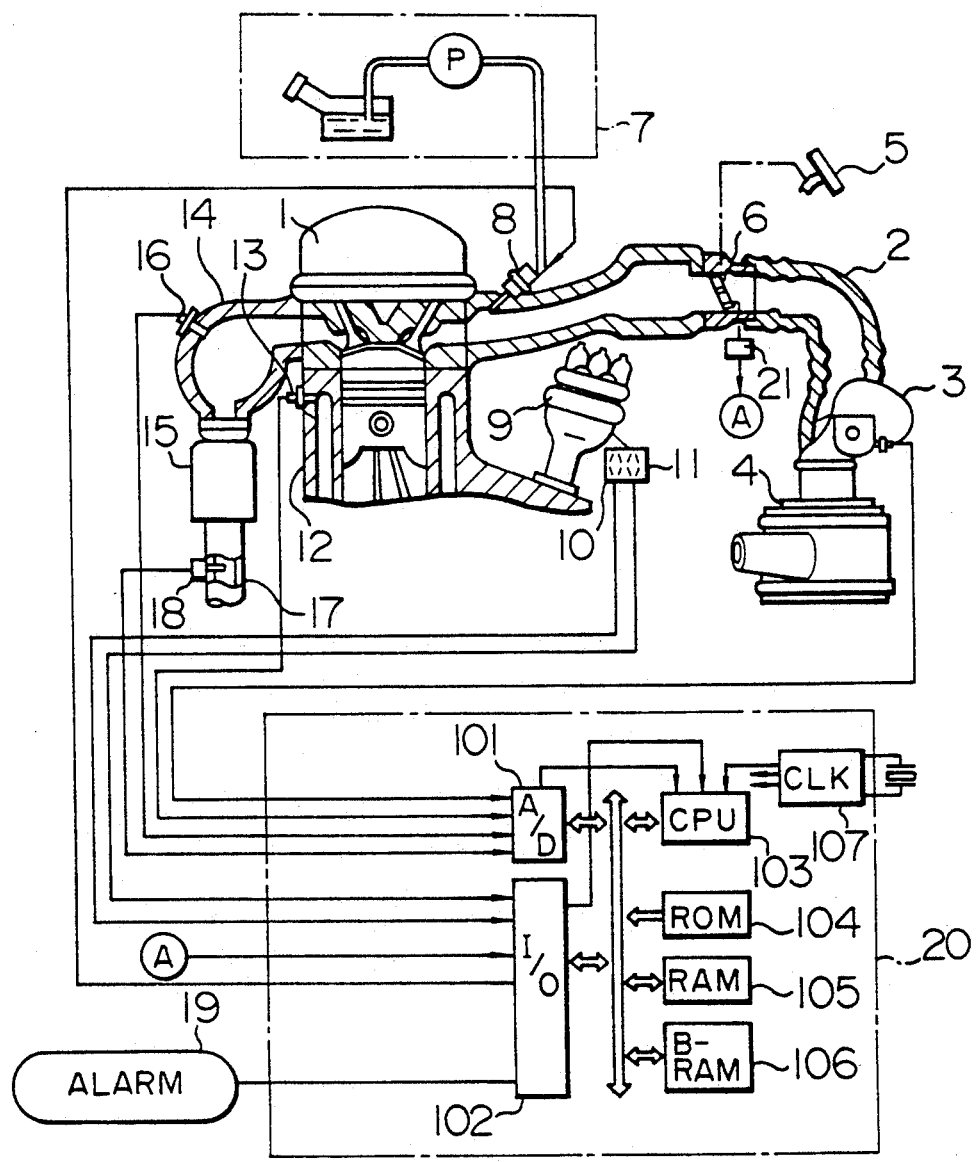
FIG. 1 is a schematic structural view which illustrates an embodiment of the present invention.

FIG. 1 is a schematic structural view which illustrates the embodiment of the present invention. An air flow meter 3 is disposed in a suction passage 2 of an internal combustion engine 1, the air flow meter 3 being arranged to directly measure the quantity Q of sucked air introduced through an air cleaner 4. Furthermore, the suction passage 2 includes a throttle valve 6 which is opened/closed in accordance with the degree for which an accelerator 5 is operated by a driver so as to adjust the quantity Q of sucked air to be supplied to the internal combustion engine 1. In addition, the throttle valve 6 has an idle switch 21 for outputting a signal to an electronic control device to be described later when the throttle valve 6 is completely closed. Moreover, each of cylinders of the internal combustion engine 1 has a fuel injection valve 8 for supplying pressurized fuel from a fuel supply system 7 to a suction port of each of the cylinders.

A distributor 9 has a reference position sensor 10 for generating a reference position detection signal at every crank angle of 720 (°CA) and a crank angle sensor 11 for generating a crank angle detection signal at every 30° CA.

A water jacket 12 of a cylinder block of the internal combustion engine 1 has a water temperature sensor 1 for detecting temperature Thw of cooling water.

On the other hand, the exhaust system has a ternary catalyst 15 capable of simultaneously purifying harmful components (HC, CO, NOx) contained in the exhaust gas, the ternary catalyst 15 being disposed in the immediately rear of an exhaust manifold 14. The ternary catalyst 15 is a so-called manifold converter directly connected to a position in the immediately rear of the exhaust manifold 14. As a result, the temperature of the ternary converter 15 can be quickly raised to the level at which the catalyst can be activated, and the size can be reduced. In the upper stream from the ternary catalyst 15, that is, the exhaust manifold 14 has an upper stream oxygen sensor ($O_2$ sensor) 16, while an exhaust pipe 17 disposed in the lower stream from the ternary catalyst 15 has a lower stream $O_2$ sensor 18. As known, each of the upper and the lower stream $O_2$ sensors 16 and 18 generates output voltage the level of which depends on a fact that the air/fuel ratio is lean or rich with respect to the theoretical air/fuel ratio.

Reference numeral 19 represents an alarm for issuing an alarm to a driver if a discrimination is made by the electronic control device (ECU) 20 to be described later that the ternary catalyst 15 has deteriorated.

The ECU 20 is constituted by, for example, a microcomputer and, as is well known, provided with an A/D converter 101, an I/0 port 102, a CPU 103, a ROM 104, a RAM 105, a backup RAM 106, and a clock generating circuit 107.

Then, a method of setting a fuel injection quantity and a method of controlling the air/fuel ratio of the engine 1 will now be described with reference to flow charts shown in FIGS. 2 to 5.

Figure 2:
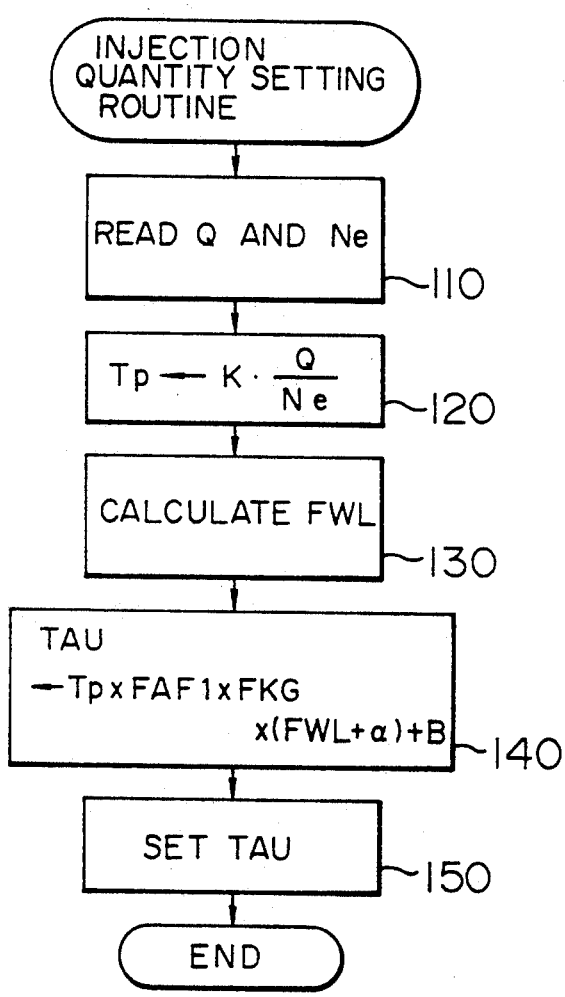
FIG. 2 is a flow chart which illustrates a routine for calculating a fuel injection quantity.

FIG. 2 is a flow chart which illustrates a fuel injection quantity calculating routine for calculating fuel injection quantity TAU in response to detection signals outputted from the aforesaid sensors. The fuel injection quantity calculating routine is started and executed at predetermined intervals (for example, 360° CA in this embodiment).

In step 110, the sucked air quantity Q and engine speed Ne are read in response to a detection signal outputted from the air flow meter 3 and that outputted from the crank angle sensor 11. In step 120, basic fuel injection quantity Tp is calculated in response to the detection signals and by the following Equation 1:

$$TP \leftarrow K \cdot Q/Ne \qquad (1)$$

where K is a constant.

In step 130, cooling water temperature Thw is read in accordance with a detection signal outputted from the water temperature sensor 12, and warm-up increase quantity value FWL is calculated by an interpolated calculation by using a one-dimensional map stored in the ROM 104 in accordance with the cooling water temperature Thw.

In step 140, final fuel injection quantity TAU is obtained (specifically in accordance with Equation 2) in accordance with air/fuel ratio correction coefficient FAF1 obtained by a main air/fuel ratio feedback control routine to be described later, air/fuel ratio correction learning coefficient FKG obtained by a main air/fuel ratio learning routine to be described later, and the warm-up increase quantity value FWL obtained in step 130.

$$TAU \leftarrow Tp \times FAF1 \times FKG \times (FWL + \alpha) + \beta \qquad (2)$$

where $\alpha$ and $\beta$ are corrections determined in accordance with other operation parameters.

In step 150, the fuel injection quantity TAU obtained by the aforesaid process is set so as to start the fuel injection, and thus this routine is completed.

Figure 3:
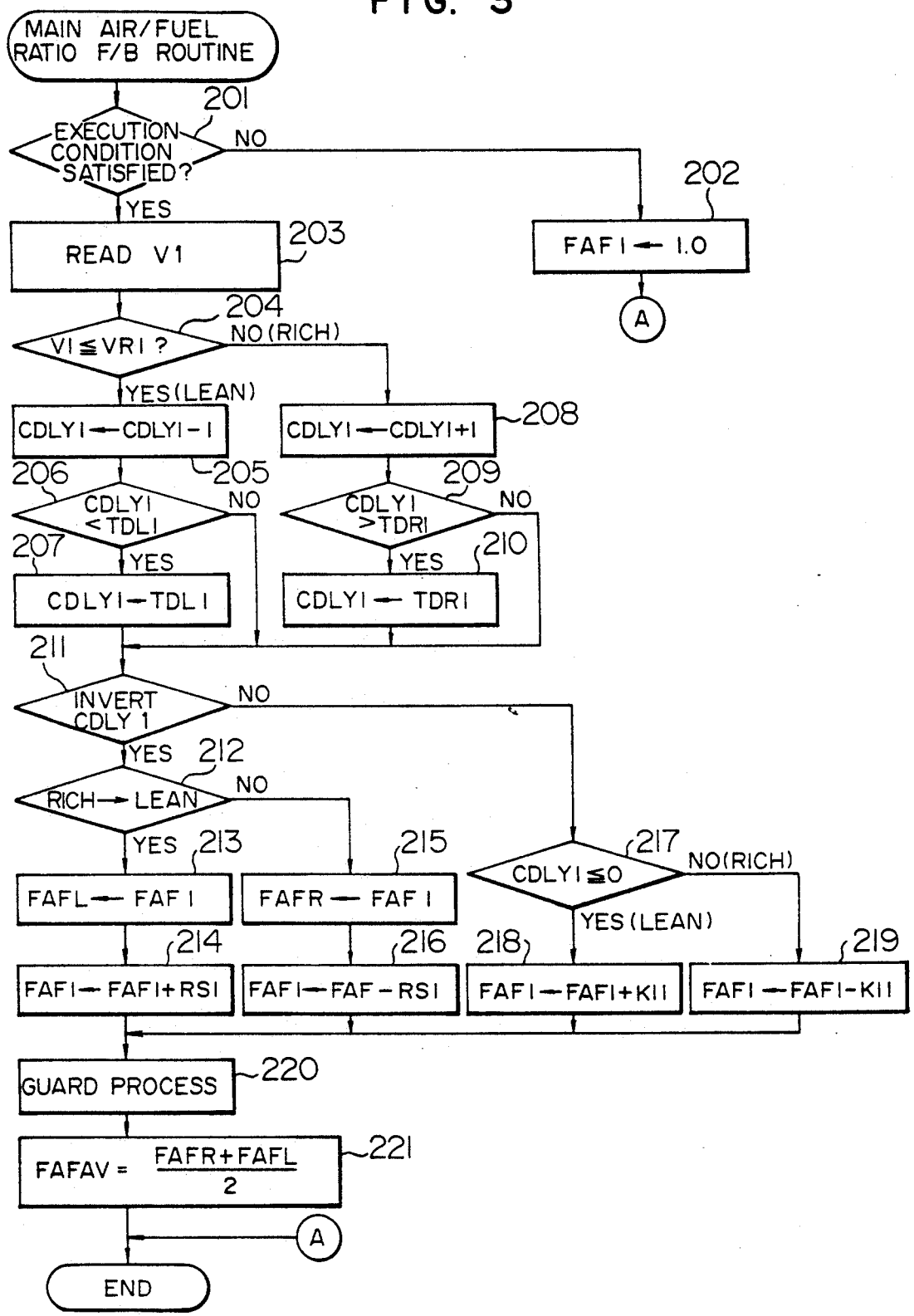
FIG. 3 is a flow chart which illustrates a main air/fuel ratio feedback process.

FIG. 3 illustrates a main air/fuel ratio feedback control to be performed in accordance with a detection signal (the upper stream output value) V1 outputted from the upper stream $O_2$ sensor 16, that is an air/fuel feedback control routine for setting the air/fuel ratio correction coefficient FAF1. This routine is started and executed at predetermined intervals (for example, 4 ms in this embodiment).

In step 201, a discrimination is made as to whether or not the conditions for the main air/fuel ratio feedback control are satisfied. The first execution condition is arranged according to this embodiment to be, for example, that the engine has been started and the upper stream $O_2$ sensor 16 is activated. If a discrimination is made in step 201 that the execution conditions are not satisfied, the flow proceeds to step 202 In step 202, the air/fuel ratio correction coefficient FAF1 is set to 1.0 (FAF1←1.0), and this routine is completed.

If a discrimination is made in step 201 that the execution conditions are satisfied, the feedback process following step 203 is performed in accordance with the output value V1 from the upper stream $O_2$ sensor 16.

In step 203, the output value V1 from the upper stream $O_2$ sensor 16 is read, in next step 204 a discrimination is made as to whether or not the upper stream output value V1 is smaller than comparison voltage VR1 (for example, 0.45 V according to this embodiment), that is, a discrimination that the air/fuel ratio is rich or lean is made. If the upper stream output value V1 is smaller than the first comparison voltage VR1, that is, if the air/fuel ratio is lean, the flow proceeds to step 205.

In step 205, the value of a first delay counter CDLY1 is decreased (CDLY1←CDLY1−1), and the flow proceeds to step 206. The first delay counter CDLY1 is a counter for measuring the time passed from a moment the output signal from the upper stream $O_2$ sensor 16 has traversed the first comparison voltage VR1, the time in the rich state being defined by a positive value and that in the lean state being defined by a negative value.

In step 206, a discrimination is made as to whether or not the value of the first delay counter CDLY1 is smaller than first lean delay time TDL1. The first lean delay time TDL1 is a count value which corresponds to the time in which the discrimination of the lean state is held even if the output signal from the upper stream $O_2$ sensor 16 has been changed from the lean state to the rich state and in which the lean state is delayed, the first lean delay time TDL1 being defined by a negative value. The first lean delay time TDL1 is a value to be determined by a sub-air/fuel ratio feedback control routine to be described later.

If a discrimination is made in step 206 that the value of the first delay counter CDLY1 is smaller than the first lean delay time TDL1, the flow proceeds to step 207. In step 207, the first delay counter CDLY1 is set to the first lean delay time TDL1 (CDLY1←TDL1), and the flow proceeds to step 211. If a discrimination is made in step 206 that the first delay counter CDLY1 is larger than the first delay time TDL1, the flow directly proceeds to step 211.

If a discrimination is made in step 204 that the upper stream output value v1 is larger than the first comparison voltage VR1, that is, if the air/fuel ration is rich, the flow proceeds to step 208. In step 208, the value of the first delay counter CDLY1 is increased (CDLY1←CDLY1+1).

In step 209, a discrimination is made as to whether or not the first delay counter CDLY1 is larger than the first rich delay time TDR1. The first rich delay time TDR1 is a count value which corresponds to the time in which the discrimination of the rich state is held even if the output signal from the upper stream $O_2$ sensor 16 has been changed from the rich state to the lean state and in which rich state is delayed, the first rich delay time TDR1 being defined by a positive value. Also the first rich delay time TDR1 is a value to be determined by a sub-air/fuel ratio feedback control routine to be described later.

If a discrimination is made in step 209 that the first delay counter CDLY1 is larger than the first rich delay time TDR1, the flow proceeds to step 210. In step 210, the first delay counter CDLY1 is set to the first rich delay time TDR1 (CDLY←TDR1), and the flow proceeds to step 211.

If a discrimination is made in step 209 that the first delay counter CDLY1 is smaller than the first rich delay time TDR1, the flow proceeds to step 211.

In step 211, a discrimination is made as to whether the sign of the first delay counter CLDY1 has been inverted. That is, whether or not the state of the air/fuel ratio has been inverted after the delay process is discriminated. If the state of the air/fuel ratio has been inverted after the delay process, a skip process is performed from step 212 to step 216. First, whether the subject inversion is made from the rich state to the lean state or from the lean state to the rich state is discriminated in step 212. If the subject inversion is made from the rich state to the lean state, the flow proceeds to step 213 in which the FAF1 at this time is stored as FAFL, and the flow proceeds to step 214.

In step 214, the air/fuel ratio correction coefficient FAF1 is increased by first skipping quantity RS1 (FAF1←FAF1+RS1), and the flow proceeds to step 220. If a discrimination is made that the subject inversion has been made from the lean state to the rich state, the flow proceeds to step 215 in which FAF1 at this time is stored as FAFR, and the flow proceeds to step 216 in which the air/fuel ratio correction coefficient FAF1 is decreased by the first skipping quantity RS1 (FAF1←FAF1−RS1), and the flow proceeds to step 220.

If a discrimination is made in step 211 that the state of the air/fuel ratio is not inverted after the delay process, an integration process from step 217 to step 219 is performed. First, whether or not the subject state is the lean state or the rich state is discriminated in step 217. If the subject state is the lean state, the flow proceeds to step 218 in which the air/fuel ratio correction coefficient FAF1 is increased by first integration constant K11 (FAF1←FAF1+K11), and the flow proceeds to step 220.

If a discrimination is made in step 217 that the subject state is the rich state, the flow proceeds to step 219. In step 219, the air/fuel ratio correction coefficient FAF1 is decreased by the first integration constant K11 (FAF1←FAF1−K11), and the flow proceeds to step 220.

In step 220, a guard process is performed so as to cause the air/fuel ratio coefficient FAF1 thus set to be included by a predetermined range (0.8 to 1.2 according to this embodiment), and the flow proceeds to step 221. In step 221, average air/fuel ratio correction coefficient FAFAV of FAF1 is obtained from FAFL and FAFR obtained in steps 213 and 215, and this routine is completed.

Figure 10:
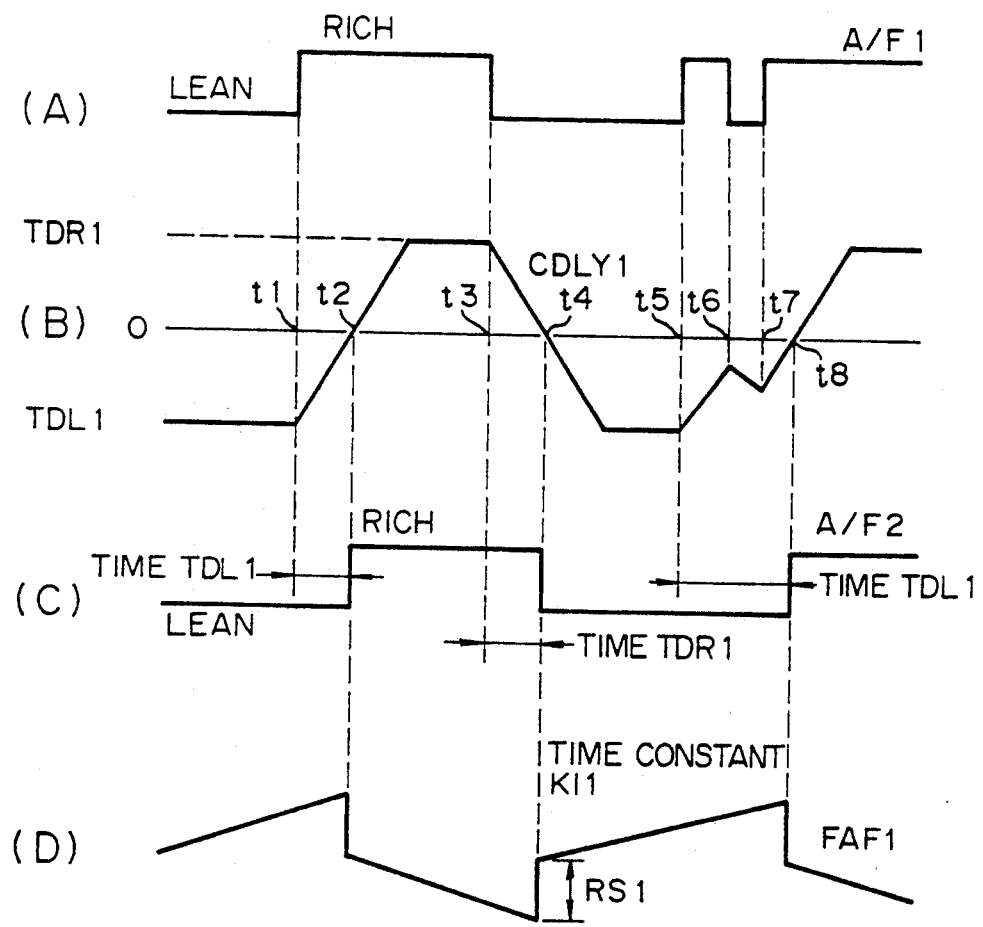
FIG. 10 is a timing chart for use in a description of the flow chart shown in FIG. 3.

FIG. 10 is a timing chart which supplementarily describes the operation flow chart shown in FIG. 3. When air/fuel ratio signal A/F1 shown in (A) of FIG. 10 for discriminating whether the state is the rich state or lean state is obtained from the output from the upper stream $O_2$ sensor 16, the count of first delay counter CDLY1 is, as shown in (B) of FIG. 10, increased if the subject state is the rich state, while the same is decreased if the subject state is the lean state. At a timing at which the value of the first delay counter CDLY1 intersects reference value 0, inversion is caused to take place from rich to lean or from lean to rich. As a result, air/fuel ratio signal A/F2 is, as shown in (C) of FIG. 10, formed.

That is, even if the air/fuel ratio signal A/F1 has been changed from the lean state to the rich state at time $t_1$, the air/fuel ratio signal A/F2, which has been subjected to the delay process, is changed to the rich state at time $t_2$ after the same has been held at the lean state for the delay time TDL1. Even if the air/fuel ratio signal A/F1 has been changed from the rich state to the lean state at time $t_3$, the air/fuel ratio signal A/F2, which has been subjected to the delay process, is changed to the lean state at time $t_4$ after the same has been held at the rich state for the delay time TDR1.

As a result, in the case where the air/fuel ratio signal A/F1 has been inverted in a period shorter than the lean delay time TDL1, for example, at times $t_5$, $t_6$ and $t_7$, a time takes for the first delay counter CDLY1 to intersect the reference value 0, causing the air/fuel ratio signal A/F2, which has been subjected to the delay process, is inverted at time $t_8$. That is, the air/fuel ratio signal A/F2, which has been subjected to the delay process, becomes a signal which is more stable than the air/fuel ratio signal A/F1 which is not subjected to the delay process.

In accordance with the air/fuel ratio signal A/F2 thus stabilized, the F/B correction coefficient FAF1 shown in (D) of FIG. 10 and for use to correct the air/fuel ratio is obtained.

Figure 4:
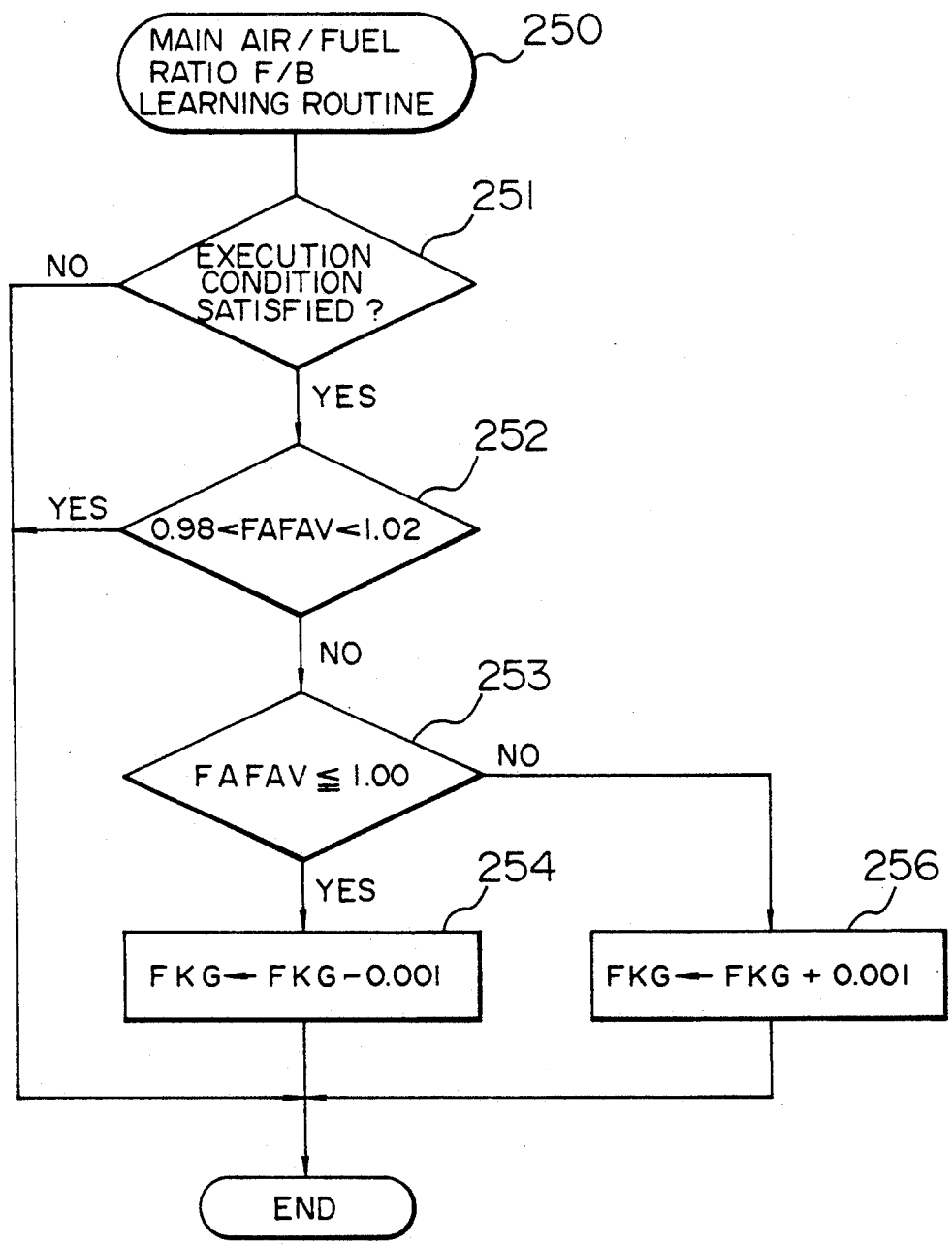
FIG. 4 is a flow chart which illustrates a main air/fuel ratio learning feedback process.

FIG. 4 is a flow chart which illustrates a learning routine of the main air/fuel ratio feedback for setting the aforesaid air/fuel ratio correction learning coefficient FKG. This routine is started and executed at predetermined intervals.

In step 251, whether or not main air/fuel ratio learning conditions have been satisfied is discriminated. The learning conditions according to this embodiment is, for example, the state after the engine has been sufficiently warmed up and also after the aforesaid main air/fuel ratio feedback control routine has been performed for a predetermined time. If a discrimination is made in step 251 that the execution conditions have been satisfied, the flow proceeds to step 252. If a discrimination is made that the execution conditions have not been satisfied, this routine is completed.

In step 252, a discrimination is made as to whether or not the average air/fuel ratio correction coefficient FAFAV calculated in the main air/fuel ratio feedback control routine approximates 1.0 (0.98<FAFAV<1.02). If FAFAV approximates 1.0, this routine is completed.

If the average air/fuel ratio correction coefficient FAFAV does not approximate 1.0, the flow proceeds to step 253. In step 253, whether or not FAFAV $\leq 1.00$ is discriminated. If the same is 1.00 or less, the flow proceeds to step 254 in which 0.001 is subtracted from the air/fuel ratio correction learning coefficient FKG. As a result, the value of FKG in Equation 2 is decreased, causing TAU to be decreased. Hence, the air/fuel ratio becomes lean, causing the value of the air/fuel ratio correction coefficient FAF1 calculated by the main air/fuel ratio feedback control routine to be increased. Therefore, FAFAV is increased.

If a discrimination is made in step 253 that the relationship FAFAV $\leq 1.00$ is not held, FAFAV is 1.02 or more. Therefore, 0.001 is added to FKG in step 256 to the contrary to step 254. As a result, the value of FKG of Equation 2 increases, causing also TAU to increase. Hence, the air/fuel ratio becomes rich, causing the value of air/fuel ratio correction coefficient FAF1 calculated by the main air/fuel ratio feedback control routine to decrease. Therefor, FAFAV decreases.

By means of the aforesaid main air/fuel ratio feedback learning routine, the average air/fuel ratio FAFAV can be converged to the neighborhood of 1.0. Therefore, also the air/fuel ratio correction coefficient FAF1 can be converged to the neighborhood of 1.0, causing the air/fuel ratio of the mixed air to be in the neighborhood of the theoretical air/fuel ratio.

Figure 5:
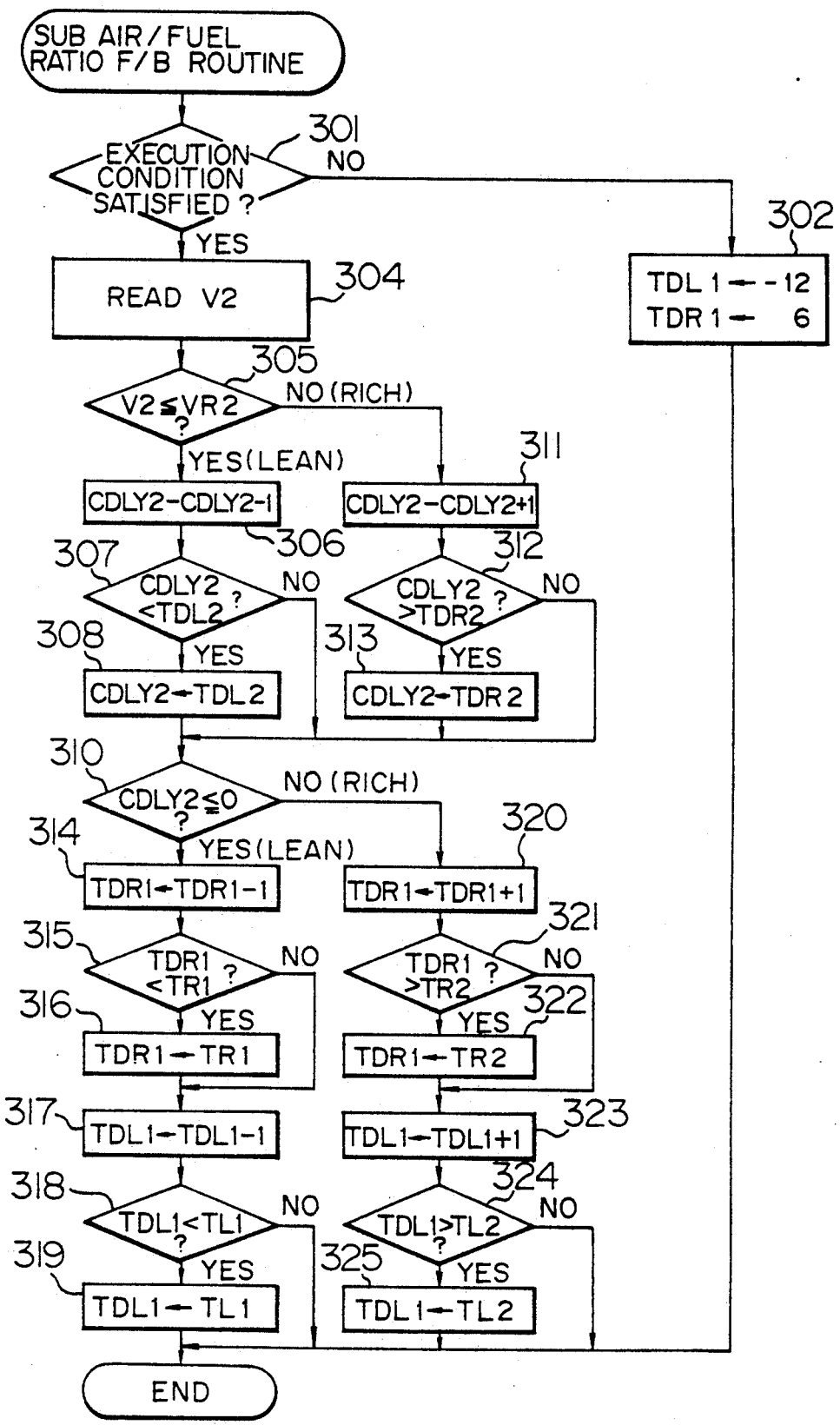
FIG. 5 is a flow chart which air/fuel ratio feedback process.

FIG. 5 is a flow chart which illustrates the sub-air/fuel ratio feedback control routine for calculating, in accordance with the output value $V_2$ of the lower stream $O_2$ sensor 18 (the lower stream output value), delay times TDR1 and TDL1 in the main air/fuel ratio feedback control. This routine is started and executed at predetermined intervals (for example, 1 sec according to this embodiment).

First, a discrimination is first made in step 301 as to whether or not the air/fuel ratio feedback condition has been satisfied, that is whether or not the sub-air/fuel ratio feedback control is executed. The second execution condition is, for example, that the main air/fuel ratio feedback control is being performed and the lower stream $O_2$ sensor 18 is being activated. In the case where the execution condition is not satisfied, the flow proceeds to step 302 in which the rich delay time TDR1 is fixed to 6 and the lean delay time TDL1 is fixed to $-12$, and this routine is completed. If a discrimination is made in step 301 that the execution condition is satisfied, the sub-air/fuel ratio feedback process following step 304 is performed in accordance with the lower stream output value V2

In step 304, the lower stream output value V2 10 of the lower stream $O_2$ sensor 18 is read. In step 305, a discrimination is made as to whether or not the lower stream output value V2 is smaller than the comparison voltage VR2 (which is, in this embodiment, set to 0.45 V which is the same as the first comparison voltage VR1), that is, whether the air/fuel ratio is rich or lean is discriminated. If the lower stream output value V2 is smaller than the second comparison voltage VR2, that is, if the air/fuel ratio is lean, the flow proceeds to step 306.

In step 306, the value of the second delay counter CDLY2 is decreased (CDLY2←CDLY2−1). In step 307, a discrimination is made as to whether or not the second delay counter CDLY2 is smaller than the second lean delay time TDL2. The second lean delay time TDL2 is a count value which corresponds to the time in which the discrimination of the lean state is held even if the output signal from the lower stream $O_2$ sensor 18 has been changed from the lean state to the rich state and in which the lean state is delayed, the second lean delay time TDL2 being defined by a negative value. If a discrimination is made in step 307 that the second delay counter CDLY2 is larger than the second lean delay time TDL2, the flow proceeds to step 310.

If a discrimination is made in step 307 that the second delay counter CDLY2 is smaller than th second leans delay time TDL2, the flow proceeds to step 308. In step 308, the second delay counter CDLY2 is set to the second lean delay time TDL2 (CDLY2←TDL2), and the flow proceeds to step 310.

If a discrimination is made in step 305 that the lower stream output value V2 is larger than the comparison voltage VR2, that is, if the air/fuel ratio is rich, the flow proceeds to step 311. In step 311, the value of the second delay counter CDLY2 is increased (CDLY2←CDLY2+1). In step 312, a discrimination is made that the second delay counter CDLY2 is larger than the second rich delay time TDR2. The second rich delay time TDR2 is a count value which corresponds to the time in which the discrimination of the rich state is held even if the output signal from the lower stream $O_2$ sensor 18 has been changed from the rich state to the lean state and in which the lean state is delayed, the second rich delay time TDR2 being defined by a positive value. If a discrimination is made in step 312 that the second delay counter CDLY2 is smaller than the second rich delay time TDR2, the flow proceeds to step 310.

If a discrimination is made in step 312 that the second delay counter CDLY2 is larger than the second rich delay time TDR2, the flow proceeds to step 313. In step 313, the second delay counter CDLY2 is set to the second rich delay time TDR2 (CDLY2←TDR2), and the flow proceeds to step 310.

In step 310, a discrimination is made as to whether or not the sign of the second delay counter CDLY2 is negative, that is, whether or not the air/fuel ratio after the delay process is lean or rich is discriminated. If the sign of the second delay counter CDLY2 is negative, that is, if the air/fuel ratio after the delay process is lean, the flow proceeds to step 314.

In step 314, the rich delay time TDR1 is decreased (TDR1←TDR1−1) so that the rich delay time TDR1 is shortened. As a result, the time in which the rich state is delayed is shortened so that the air/fuel ratio is controlled to the rich side.

In steps 315 and 316, the rich delay time TDR1 is guarded to the minimum value TR1. The minimum value TR1 is defined by a positive value and therefore the minimum value TR1 means the shortest rich delay time.

In step 317, the lean delay time TDL1 is decreased (TDL1←TDL1−1) so as to shorten the lean delay time TDL1 in order to control the air/fuel ratio to a further rich value. In steps 318 and 319, the lean delay time TDL1 is guarded to the minimum TL1, and this routine is completed. The minimum value TL1 is defined by a negative value and therefore the minimum value TL1 means the shortest rich delay time.

If a discrimination is made in step 310 that the sign of the second delay counter CDLY2 is positive, that is, if the air/fuel ratio is rich after the delay process, the flow proceeds to step 320.

In step 320, the rich delay time TDR1 is increased (TDR1←TDR1+1) so that the rich delay time TDR1 is lengthened. As a result, the time, in which the rich state is delayed, is lengthened so that the air/fuel ratio is controlled to a lean value.

In steps 321 and 322, the rich delay time TDR1 is guarded to the maximum value TR2. Also the maximum value TR2 is defined by a positive value, and therefore the maximum value TR2 means the maximum rich delay time.

In step 323, the lean delay time TDL1 is increased (TDL1←TDL1+1) so that the lean delay time TDL1 is lengthened for the purpose of controlling the air/fuel ratio to a further lean value. In steps 324 and 325, the lean delay time TDL1 is guarded to the maximum value TL2, and this routine is completed. Also the maximum value TL2 is defined by a negative value and therefore the maximum value TL2 means the longest lean delay time.

The rich delay time TDR1 and the lean delay time TDL1 thus obtained are used in the aforesaid main air/fuel ratio feedback control routine in which it compensate scattering the output signals from the upper stream $O_2$ sensor 16, so that optimum control of the air/fuel ratio of the internal combustion engine 1 can be performed.

Then, a method of detecting the deterioration of the ternary catalyst 15 will now be described. This deterioration detection process is executed only when the internal combustion engine 1 is in the idle state. The reason why the deterioration detection process is performed only in the idle state will now be described in detail.

First, consideration is made about the response delay time T of the upper and the lower stream $O_2$ sensors 16 and 18 taken place in the (lean) case where oxygen is caused to flow in the (rich) state where no oxygen is stored in the ternary catalyst 15. That is, the response delay time T is the delay time from the moment the output signal from the upper stream $O_2$ sensor 16 has been changed from rich to lean to the moment the output signal from the lower stream $O_2$ sensor 18 has been changed from rich to lean.

Response delay time $T_F$ from the moment the mixed gas to be supplied to the internal combustion engine 1 has been changed from rich to lean to the moment the output signal from the upper stream $O_2$ senor 16 has been changed from rich to lean is expressed by the following Equation 3:

$$T_{F1} = t_1 + D_1 \quad (3)$$

where $t_1$ is the delay time taken for the exhaust gas from the internal combustion engine to reach the upper stream $O_2$ sensor 16, and $D_1$ is the response delay time stream $O_2$ sensor 16.

Figure 12:
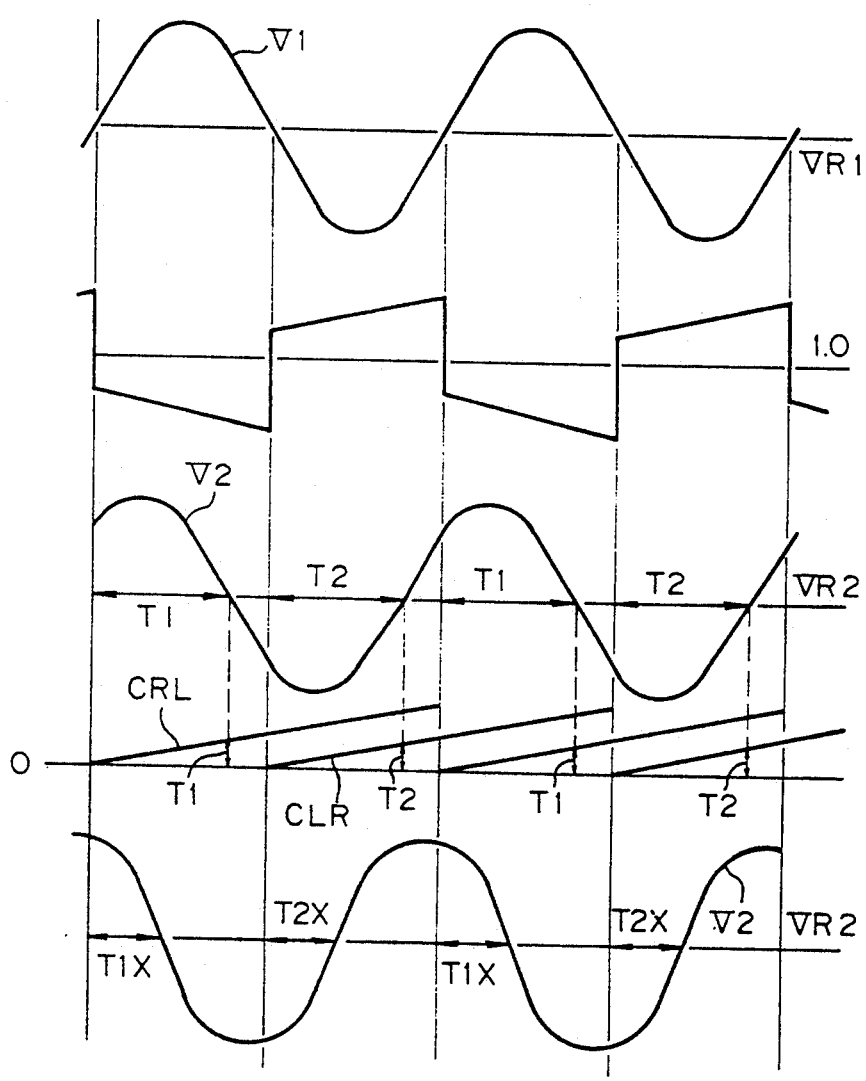
FIG. 12 is a timing chart which illustrates the output waveform of a lower stream $O_2$ sensor formed in accordance with the state of deterioration of a ternary catalyst.

Time $T_R$ from the moment the mixed gas to be supplied to the internal combustion engine 1 has been changed from rich to lean to the moment the output signal from the lower steam $O_2$ sensor 18 has been changed from rich to lean is expressed by the following Equation 4:

$$T_R = t_1 + t_2 + (V_{o2}/QO_2) + t_3 + D_2 \quad (4)$$

where $t_2$ is the time taken for the exhaust gas to flow from the upper stream $O_2$ sensor 16 to the ternary catalyst 15, $V_{o2}/QO_2$ is the time taken for the oxygen storage capacity Vo of the catalyst to overflow, $t_3$ is the time taken for the exhaust gas to flow from the ternary catalyst 15 to the lower stream $O_2$ sensor 18, $D_2$ is the response delay time of the lower stream $O_2$ sensor 18, and $QO_2$ is the flow rate of oxygen in the exhaust gas, the oxygen flow rate $QO_2$ and sucked air quantity Q having the relationship as shown in FIG. 12 and having inclination K which is a coefficient defined by the oxygen density in the exhaust gas.

Therefore, the response delay time T can be obtained from Equations 3 and 4 and be expressed by Equation 5:

$$T = T_R - T_F = (V_{02}/QO_2) + (D_2 - D_1) + (t_2 + t_3) \quad (5)$$

$(D_2 - D_1)$ in Equation 5 is a value which is obtainable from the response delay time of the upper and the lower stream $O_2$ sensors 16 and 18 and which is scattered depending upon the change with the passage of time or the manufacturing error, of $O_2$ sensors.

The deterioration of the ternary catalyst 15 is ordinarily detected in such a manner that the response delay time T and a predetermined value $\beta$ are subjected to a comparison and a discrimination is made that the ternary catalyst 15 has been deteriorated if the response delay time T is shorter than the predetermined value $\beta$. Therefore, it is important for accurately detecting the deterioration to cause scattering of the response delay time T taken place due to $(D_2 - D_1)$ to be converged. Accordingly, the present invention is arranged in such a manner that the deterioration is detected under the condition that the response delay time T is lengthened so that the influence of the overall scattering of the response delay time T taken due scattering of $(D_2 - D_1)$ is minimized satisfactorily.

Figure 11:
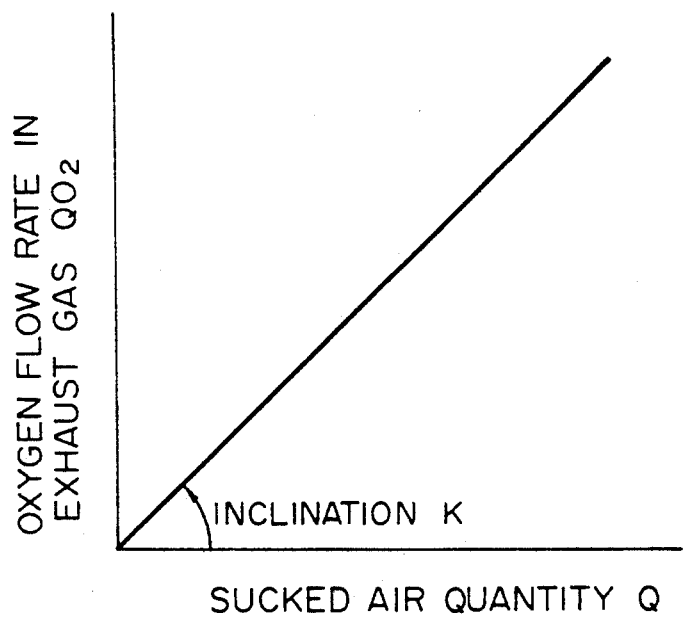
FIG. 11 is a graph which illustrates the relationship between the sucked quantity of air and the flow rate of oxygen in an exhaust gas.

In order to lengthen the response delay time T, the oxygen flow rate $QO_2$ contained by the exhaust gas and included by Equation 5 must be decreased. In order to decrease the oxygen flow rate $QO_2$, the sucked air quantity Q shown in FIG. 11 must be reduced. Therefore, it can be understood that the deterioration must be detected at the time of the idling operation in which the sucked air quantity Q is minimized for the purpose of lengthening the response delay time T.

Figure 6:
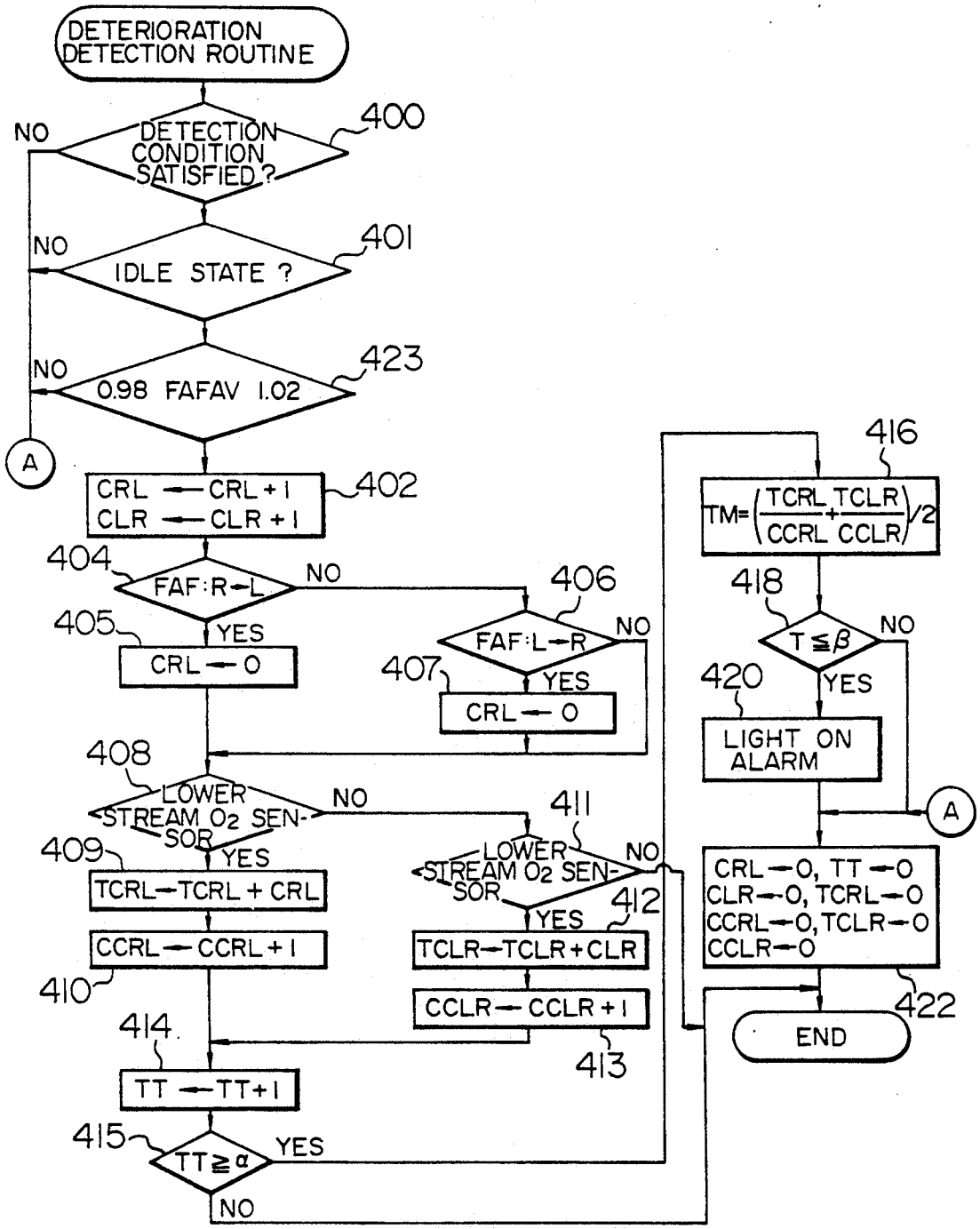
FIG. 6 is a flow chart which illustrates a routine for detecting the deterioration of a catalyst.

FIG. 6 is an operation flow chart for detecting the deterioration of the ternary catalyst 16 arranged while taking the aforesaid factors into consideration. This routine for detecting the deterioration of the catalyst is started and executed at a predetermined interval (for example, 4 msec).

In step 400, whether or not the condition for executing the catalyst deterioration detection process has been satisfied is discriminated. If it has been satisfied, the flow proceeds to step 401. If it is not satisfied, the flow proceeds to step 422. The condition is, for example, that the upper and the lower stream $O_2$ sensors 16 and 18 are activated.

In step 401, a discrimination is made in accordance with information about the idle switch 21 and that from a car speed sensor as to whether or not the internal combustion engine 1 is in an idle state. If it is not in the idle state, the flow proceeds to step 422. If it is in the idle state, the flow proceeds to step 423. In step 423, a discrimination is made as to whether or not the average air/fuel ratio correction coefficient FAFAV calculated by the main air/fuel ratio feedback control routine shown in FIG. 3 is converged to the neighborhood of 1.0. If a discrimination is made that it is not converged, the flow proceed to step 422. If a discrimination is made that it is converged as described above, a discrimination is made that the air/fuel ratio of the mixed gas is in the neighborhood of the theoretical air/fuel ratio, and the catalyst deterioration detection process in step 402 and ensuing steps is executed.

In step 402, the counts of counters CRL and CLR are increased (CRL←CRL+1, CLR←CLR+1).

The count of the counter CRL corresponds to the time taken from the moment the air/fuel ratio correction coefficient FAF has been changed from rich to lean in the skip manner, while the count of the counter CLR corresponds to the time taken from the moment the air/fuel ratio correction coefficient FAF has been changed from lean to rich in the skip manner.

FIG. 12 illustrates the change characteristics of the air/fuel ratio correction coefficient FAF1, the output waveform of the upper stream $O_2$ sensor 16 and the waveform of the lower stream $O_2$ sensor 18, wherein the output from the lower stream $O_2$ sensor 18 traverses the comparative voltage VR2 toward the lean side or the rich side after corresponding predetermined times T1 and T2 have passed from the change (from the rich side to the lean side and from the lean side to the rich side) of the air/fuel ratio correction FAF1 taken place in the skip manner.

That is, if the ternary catalyst 15 is in the normal state, its storage effect will delay the propagation of the change of the air/fuel ratio taken place due to the change of the air/fuel ratio correction coefficient FAF1 to the lower stream $O_2$ sensor 18. However, if the catalyst 15 deteriorates, its storage effect deteriorates, causing the delay times T1x and T2X of the change of the output from the lower stream $O_2$ sensor 18 taken from the change of the air/fuel ratio correction coefficient FAF to be shortened with respect to delay times T1 and T2 taken place in the normal state.

This embodiment is arranged in such a manner that the delay time T1 is counted by the counter CRL, the delay time T1 being the time taken from the moment the air/fuel ratio correction coefficient FAF1 has been changed from the rich side to the lean side to the moment the output voltage V2 from the lower stream $O_2$ sensor 18 is reduced to a level lower than the comparative voltage VR2. Furthermore, delay time T2 is counted by the counter CLR, the delay time T2 being the time taken from the moment the air/fuel ratio correction coefficient FAF1 has been changed from the lean side to the rich side to the moment the output voltage V2 is raised to a level higher than the comparative voltage VR2. Then, T1 and T2 are obtained by a predetermined times α(for example, 10 times) so as to calculate the average value of T1 and T2, the average value being used to discriminate the deterioration of the catalyst 15.

Referring back to FIG. 6, the counts of the counters CRL and CLR are increased in step 402. Then, the flow proceeds to step 404 in which a discrimination is made as to whether or not the air/fuel ratio correction coefficient FAF1 has been changed from the rich side to the lean side in the skip manner, that is, whether or not the air/fuel ratio correction coefficient FAF1 has been lowered from 1.0 or more to 1.0 or less is discriminated. If the same has been changed from the rich side to the lean side, the counter CRL is reset (CRT←0) in step 405.

If a discrimination is made in step 404 that the air/fuel ratio correction coefficient FAF1 has not been changed from the rich side to the lean side in the skip manner, the flow proceeds to step 406. In step 406, a discrimination is made as to whether or not the air/fuel ratio correction coefficient FAF1 has been changed from the lean side to the rich side in the skip manner, that is, whether or not the air/fuel ratio correction coefficient FAF1 has been raised from 1.0 or less to 1.0 or more is discriminated. If it has been changed from the lean side to the rich side, the flow proceeds to step 407. In step 407, the counter CLR is reset, and the flow proceeds to step 408. If a discrimination is made in step 406 that it has not been changed from the lean side to the rich side, the flow proceeds to step 408.

In step 408, a discrimination is made as to whether or not the output signal from the lower stream $O_2$ sensor 18 has been changed from the rich side to the lean side in the skip manner, that is, whether or not the air/fuel ratio correction coefficient FAF2 has been lowered from 1.0 or more to 1.0 or less is discriminated. If it has been changed from the rich side to the lean side, the flow proceeds to step 409. In step 409, the current count value CRL (a value corresponding to T1) is added to an accumulation counter TCRL which corresponds to the accumulated value of the delay time T1 (TCRL←TCRL+CRL). In step 410, an accumulation time counter CCRL which counts the number of times of accumulating the count value CRL is increased (CCRL←CCRL+1), and the flow proceeds to step 414.

If a discrimination is made in step 408 that it has not been changed from the rich side to the lean side, the flow proceeds to step 411. In step 411, a discrimination is made as to whether or not the air/fuel ratio correction coefficient FAF2 has been changed from the lean side to the rich side in the skip manner, that is, whether or not the air/fuel ratio correction coefficient FAF2 has been raised from 1.0 or less to 1.0 or more is discriminated. If a discrimination has been made that the change from the lean side to the rich side has taken place, the flow proceeds to step 412 in which the current count value CRL (a value corresponding to T2) is added to the counter TCLR which accumulates the delay time T2 (TCLR←TCLR+CRL). In step 413, the accumulation counter CCLR which indicates the number of times of accumulating the count value CRL is increased (CCLR←CCLR+1), and the flow proceeds to step 414. If a discrimination is made in step 411 that the air/fuel ratio correction coefficient FAF2 has not been changed from the lean side to the rich side in the skip manner, this routine is completed.

In step 414, the count of an execution accumulating counter TT, which corresponds to the number of times of accumulating the delay times T1 and T2 obtained in steps 409 and 412, is increased (TT←TT+1). In step 415, a discrimination is made as to whether or not the count of the execution accumulating counter TT has reached a predetermined number of times (accumulated a predetermined period). If it has not reached a predetermined number of times α, this routine is completed. If the count of the execution accumulating counter TT has counted the predetermined number of times α or more, processes from steps #16 to step 422 are executed.

In step 416, average value TM of the delay times T1 and T2 of the execution accumulating counter TT is calculated from the following equation:

$$TM = (TCRL/CCRL + TCLR/CCLR)/2 \quad (6)$$

where TCRL/CCRL corresponds to the average value of CCRL times of the delay time T1, and TCLR/CCLR corresponds to the average value of CCLR times of the delay time T2. Therefore, the average value TM, which can be obtained by dividing the sum of the two values by 2, is the average value of the delay time including the delay times T1 and T2.

In step 418, the average value TM and deterioration evaluation value $\beta$ are subjected to a comparison. If the average value TM is smaller than the deterioration evaluation value $\beta$, a discrimination is made that the ternary catalyst 15 has deteriorated, and the flow proceeds to step 420. In step 420, the alarm 19 is lit on in order to notify the driver that the ternary catalyst 15 has deteriorated, and the flow proceeds to step 422.

If a discrimination is made in step 418 that the average value TM is not smaller than the deterioration evaluation value $\beta$, the ternary catalyst 15 has not deteriorated, and therefore the flow proceeds to step 422.

In step 422, the counters CRL and CLR, the accumulation counters TCRL and TCLR, the accumulation number of times counters CCRL and CCLR and the execution accumulating counter TT are reset, and this routine is completed.

Therefore, the deterioration of the ternary catalyst 15 can be accurately detected by performing the aforesaid process while utilizing the characteristics that the period of the output signal from the lower stream $O_2$ sensor becomes shortened, and the delay time T from the moment the upper stream $O_2$ sensor 16 has been changed from the rich side to the lean side (or from the lean side to the rich side) to the moment the lower stream $O_2$ sensor 18 has been changed from the rich side to the lean side (or from the lean side to the rich side) is shortened if the ternary catalyst 15 has deteriorated.

Furthermore, the delay time T can be lengthened according to this embodiment by performing the catalyst deterioration detection process at the time of the idle process of the internal combustion engine 1. Hence, the considerable change of the delay time T (TM) due to scattering of the reaction times of the upper and the lower stream $O_2$ sensors 16 and 18 can be prevented. As a result, even if the upper and the lower stream $O_2$ sensors 16 and 18 involve scattered reaction time, the deterioration of the ternary catalyst 15 can be accurately detected by setting the deterioration evaluation value $\beta$ to a large value.

Although the aforesaid embodiment is arranged in such a manner that the deterioration of the catalyst is detected by using the average value T of the delay times T1 and T2 which are obtained by a predetermined number of times, the deterioration of the catalyst may be discriminated by subjecting only the average value (TCRL/CCRL) of the delay time T1 or only the average value (TCLR/CCLR) of the delay time T2 to a comparison with the deterioration evaluation level $\beta$.

The deterioration of the catalyst may be discriminated by subjecting the delay time T1 or T2 for only one time to a comparison with the deterioration evaluation level $\beta$ in place of the result of the division of the result of accumulation of the delay times T1 and T2 by the number of times of the accumulations, that is, in place of the average value.

As an alternative to this, the deterioration discrimination process in step 416 and ensuing steps may be performed at a predetermined interval (for example, 640 msec) in place of executing the deterioration discrimination process in step 416 and ensuing steps after the number of times of accumulating the delay times T1 and T2 have exceeded the predetermined number of times α.

A second embodiment of the catalyst deterioration detection process according to the present invention will now be described with reference to flow charts shown in FIGS. 7 to 9.

Figure 7:
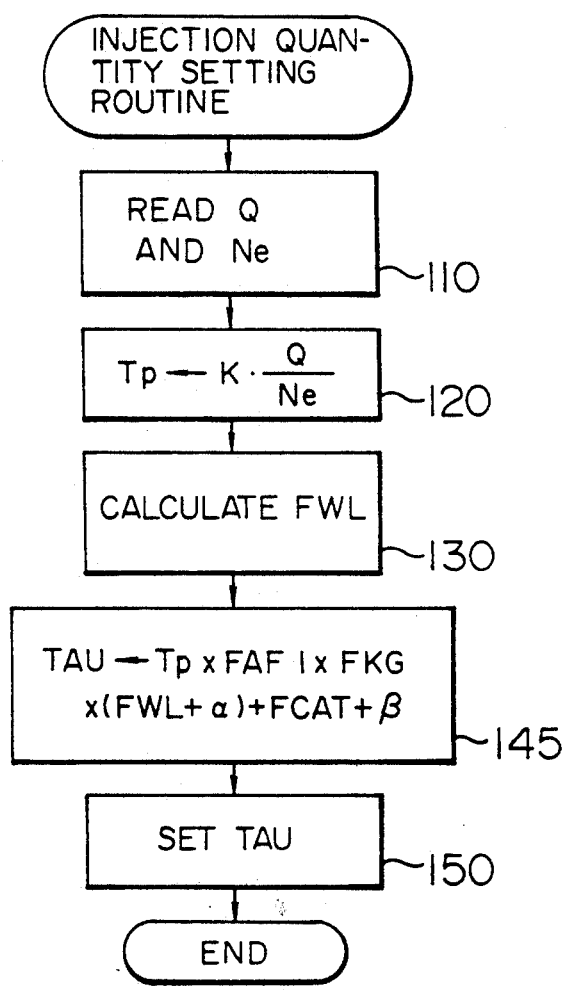
FIG. 7 is a flow chart which illustrates a routine for calculating the fuel injection quantity according to another embodiment of the present invention.

FIG. 7 is a flow chart which illustrates a fuel jet quantity calculation routine according to the second embodiment for calculating the fuel injection quantity TAU of the internal combustion engine. This routine is started and executed at a predetermined interval (for example, 360° CA according to this embodiment). The same processes as those shown in FIG. 2 are given the same reference numerals and their descriptions are omitted here.

The difference from the routine shown in FIG. 2 lies in step 145 in which the fuel injection quantity TAU is obtained by using diagnosis air/fuel ratio correction coefficient FCAT in addition to the air/fuel ratio correction coefficient FAF1, the air/fuel ratio correction learning coefficient FKG and the warming-up increase quantity value FWL (according to Equation 7).

$$TAU \leftarrow Tp \times FAF1 \times FKG \times (FWL + \alpha) \times FCAT + \beta \quad (7)$$

Figure 8:
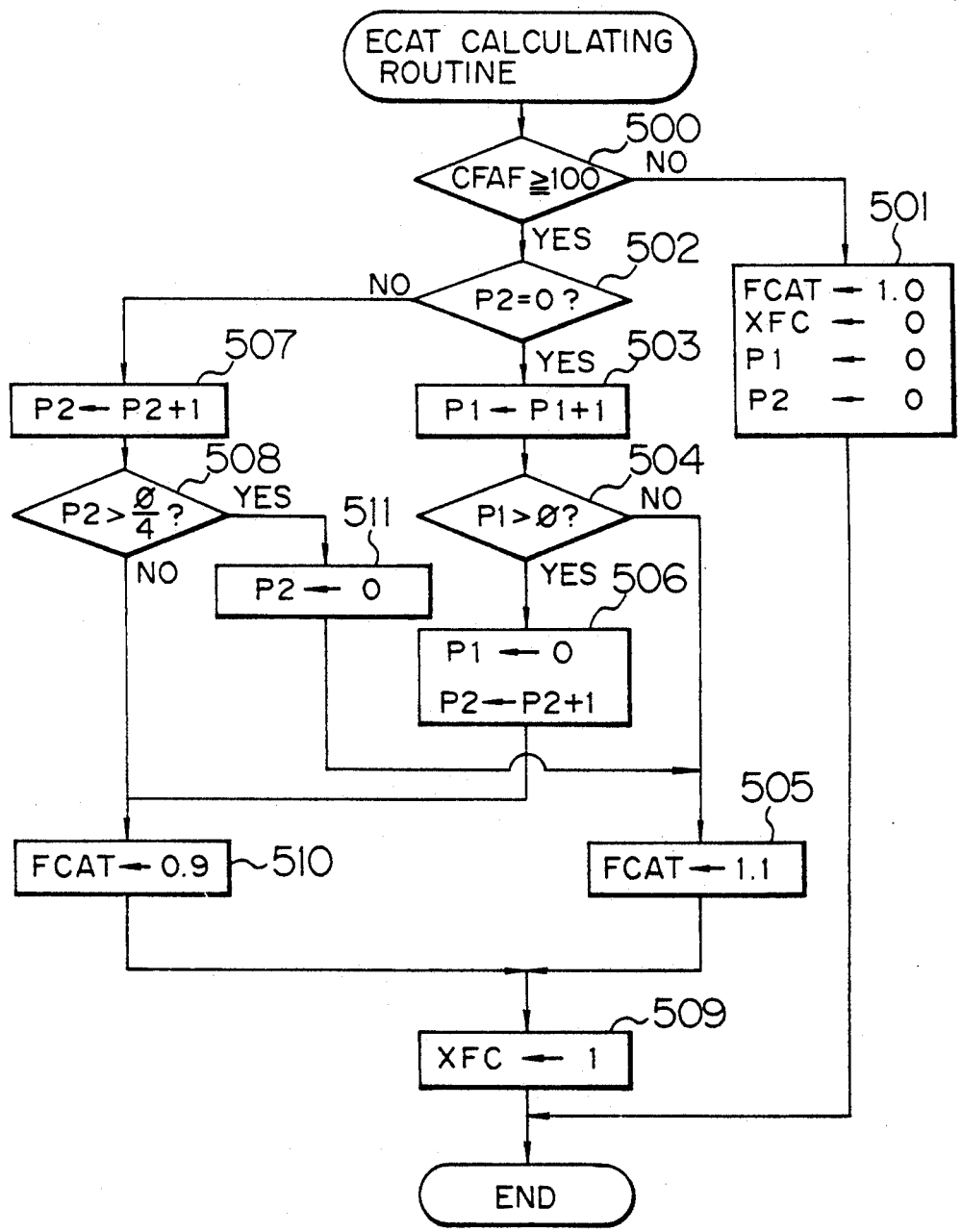
FIG. 8 is a flow chart which illustrates a routine for setting a diagnosis air/fuel ratio correction coefficient.

The diagnosis air/fuel ratio correction coefficient FCAT is a value which can be calculated from a routine to be described later, the value of the diagnosis air/fuel ratio correction coefficient FCAT being maintained at 1.0 in an ordinary state where the catalyst deterioration detection process is not performed FIG. 8 is a flow chart which illustrates the operation for setting the diagnosis air/fuel ratio correction coefficient FCAT. The routine shown in FIG. 8 is started and executed at a predetermined interval (for example, 4 ms according to this embodiment).

In step 500, a discrimination is made as to whether or not counter CFAF for use in the catalyst deterioration detection routine shown in FIG. 10 to be described later holds, for example, a relationship CFAF≧100. If CFAF is not 100 or more the flow proceeds to step 501 in which the diagnosis air/fuel ratio correction coefficient FCAT is maintained at 1.0, and diagnosis fuel injection flag XFC to be described later is reset (XFC←0). Furthermore, a process in which the first and the second injection counters are reset is executed, and this routine is completed. If CFAF is 100 or more, processes in step 502 and ensuing steps are performed.

In step 502, a discrimination is made as to whether or not value P2 of the second injection counter is 0. If it is 0, the flow proceeds to step 503. If it is not 0, the flow proceeds to step 507. It should be noted that the flow first proceeds to step 503 because the value P2 of the second injection counter is 0.

In step 503, the diagnosis air/fuel ratio correction coefficient FCAT is used to increase the count of the first injection counter (P1←P1+1) in order to control the air/fuel ration to the rich side and the lean side. In step 504, a discrimination is made as to whether or not value P1 of the first injection counter is larger than a predetermined value $\phi$ ($\phi$=100 according to this embodiment). If the value P1 of the first injection counter is not larger than the predetermined value $\phi$, the flow proceeds to step 505. It should be noted that the flow first proceeds to step 505 because the value P1 of the first injection counter P1 is not larger than the predetermined $\phi$.

In step 505, the diagnosis air/fuel ratio correction coefficient FCAT is set 1.1, and the flow proceeds to step 509 in which the diagnosis fuel injection flag XFC denoting that the current fuel injection quantity TAU is forcibly changed in accordance with the diagnosis air/fuel ratio correction coefficient FCAT is set (XFC←1), and this routine is completed.

By repeating the aforesaid process by the predetermined number of times $\phi$, the value P1 of the fist injection counter P1 increased in step 503 becomes larger than the predetermined value $\phi$, and a discrimination is made in step 504 that the value P of the injection counter is larger than the predetermined value $\phi$. Then, the flow proceeds to step 506. In step 506, the first injection counter is rest (P1←0), and the count of the second injection counter is increased (P2←P2+1). Then, the flow proceeds to step 510 in which the diagnosis air/fuel ratio correction coefficient FCAT is set to 0.9, and the flow proceeds to step 509. Then, this routine is completed.

Since the value P2 of the second injection counter is not 0 at the next execution timing, the flow proceeds from step 502 to step 507. In step 507, the count of the second injection counter is increased (P2←P2+1). In step 508, a discrimination is made as to whether or not the value P2 of the second injection counter is larger than the value $\phi/4$ ($\phi/4$=25 in this embodiment) which is ¼ times of the predetermined value $\phi$. If it is not larger than $\phi/4$, the flow proceeds to step 510. If it is larger than $\phi/4$, the flow proceeds to step 511. In step 511, the second injection counter is reset (P2←0), and the flow proceeds to step 505.

Figure 13:
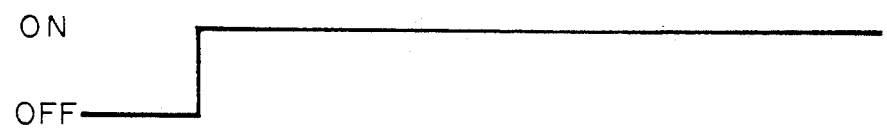
FIG. 13 is a timing chart which illustrates the output waveform of a lower stream $O_2$ sensor formed in accordance with the state of deterioration of a ternary catalyst according to another embodiment of the present invention.
Figure 13:
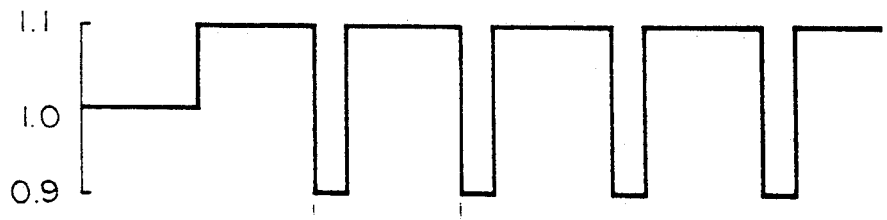
Figure 13:
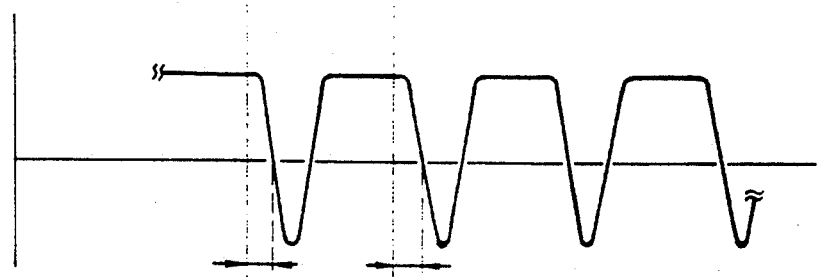
Figure 13:
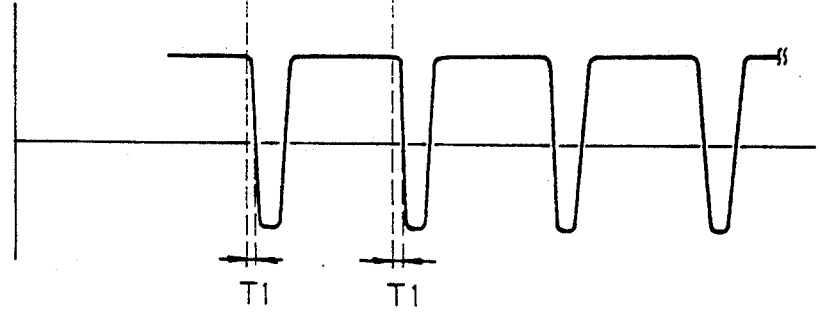

By setting the diagnosis air/fuel ratio correction coefficient FCAT in accordance with the aforesaid routine, the value of the diagnosis air/fuel ratio correction coefficient FCAT repeatedly becomes 1.1 and 0.9, as shown in (D) of FIG. 13. By setting the fuel injection quantity TAU by using the diagnosis air/fuel ratio correction coefficient FCAT in accordance with the routine shown in FIG. 7 the air/fuel ratio of the internal combustion engine 1 forcibly repeatedly becomes rich and lean at a predetermined interval.

Figure 9:
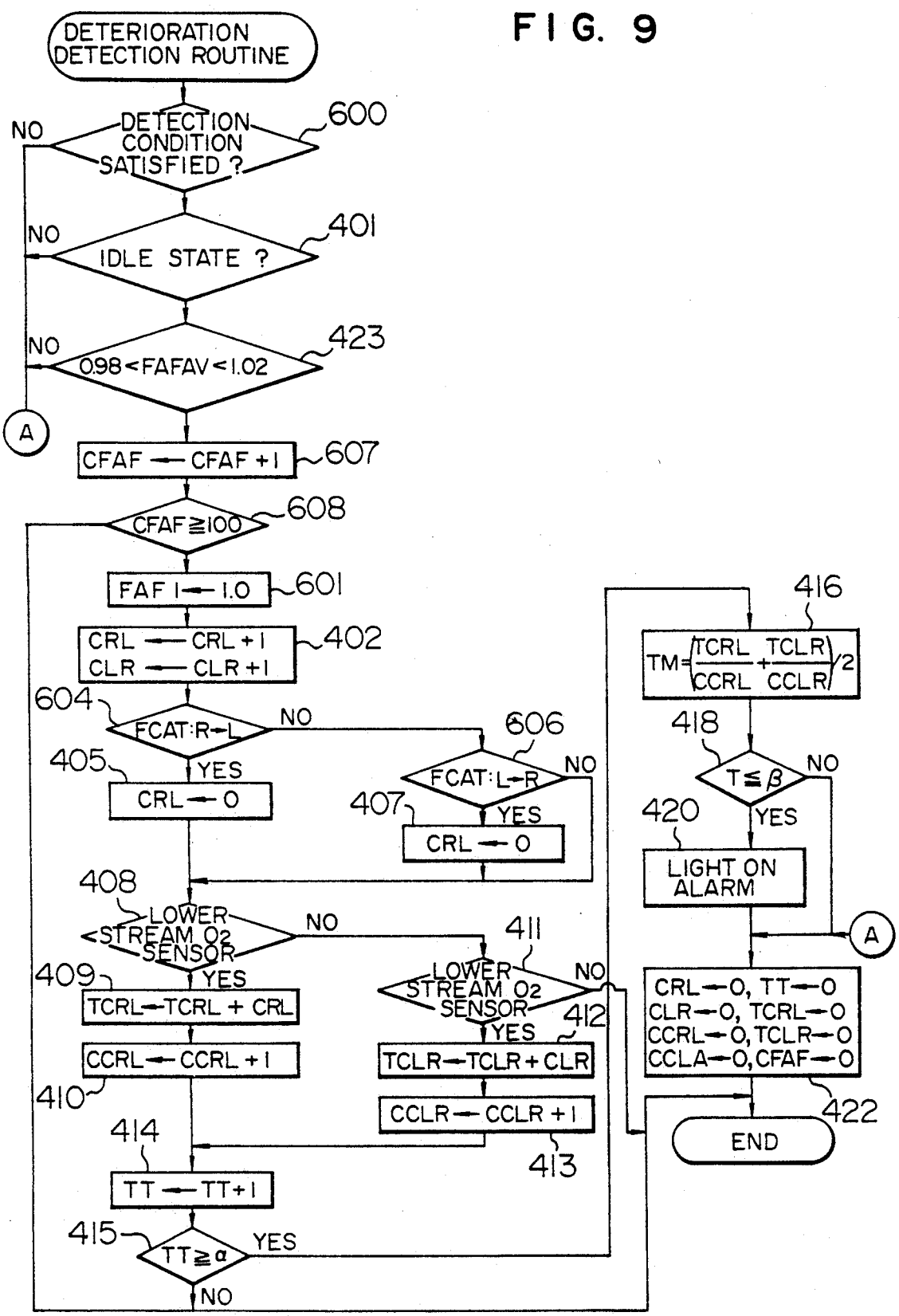
FIG. 9 is a flow chart which illustrates a routine for detecting the deterioration of a catalyst according to another embodiment of the present invention.

FIG. 9 is a flow chart which illustrates the operation of detecting the deterioration of the ternary catalyst 15 by forcibly changing the air/fuel ratio of the internal combustion engine 1 between rich and lean. This routine is started and executed at a predetermined interval (for example, 40 ms). The same processes as those in the routine shown in FIG. 6 are given the same reference numerals and their descriptions are omitted here.

In step 600, a discrimination is made as to whether or not the condition for executing the catalyst deterioration detection process is satisfied. If it is satisfied, the flow proceeds to step 401. If it is not satisfied, the flow proceeds to step 422. In step 422, also the counter CFAF is reset in addition to executing the routine shown in FIG. 6. The execution condition in step 600 is, for example, that the upper and the lower stream $O_2$ sensors 16 and 18 are active and the diagnosis fuel injection flag XFC has been set.

In step 607, the count of the counter CFAF is increased. The counter CFAF indicates the time at which the average air/fuel ratio correction coefficient FAFAV has converged to the neighborhood of 1.0. In step 608, a discrimination is made as to whether or not CFAF≧100. If CFAF is 100 or more, the flow proceeds to step 601. If it is not 100 or more, this routine is completed. As a result, the air/fuel ratio correction coefficient FAF1 can be satisfactorily converged to the neighborhood of 1.0. That is, a discrimination is made that the air/fuel ratio of the mixed gas is in the neighborhood of the theoretical air/fuel ratio, FAF1 is fixed to 1.0 in the next step 601, and starting of the open loop control following step 601, that is, the catalyst deterioration detection process is permitted.

Since CFAF≧100 is simultaneously held in step 500 in the routine shown in FIG. 8, the process for setting the diagnosis air/fuel ratio correction coefficient FCAT is executed.

Then, the counts of the counters CRT and CLR are increased in step 402 similarly to the deterioration detection routine shown in FIG. 6, and the flow proceeds to step 604. In step 604, a discrimination is made as to whether or not the diagnosis air/fuel ratio correction coefficient FCAT has been changed from rich to leans, that is, whether or not it is changed from 1.1 to 0.9 is discriminated. If the diagnosis air/fuel ratio correction coefficient FCAT has been changed from rich to lean, the flow proceeds to step 405. If a discrimination is made in step 604 that the diagnosis air/fuel ratio correction coefficient FCAT has not been changed from rich to lean, the flow proceeds to step 606. In step 604, a discrimination is made as to whether or not the diagnosis air/fuel ratio correction coefficient FCAT has been changed from lean to rich. If the diagnosis air/fuel ratio correction coefficient FCAT has been changed from lean to rich, the flow proceeds to step 407. If it has not been changed from lean to rich, the flow proceeds to step 408.

Then, the routine similar to that shown in FIG. 6 is executed so that the deterioration of the ternary catalyst 15 is detected. The change of the lower stream $O_2$ sensor 18 taken at this time is shown in FIG. 13.

Figure 14:
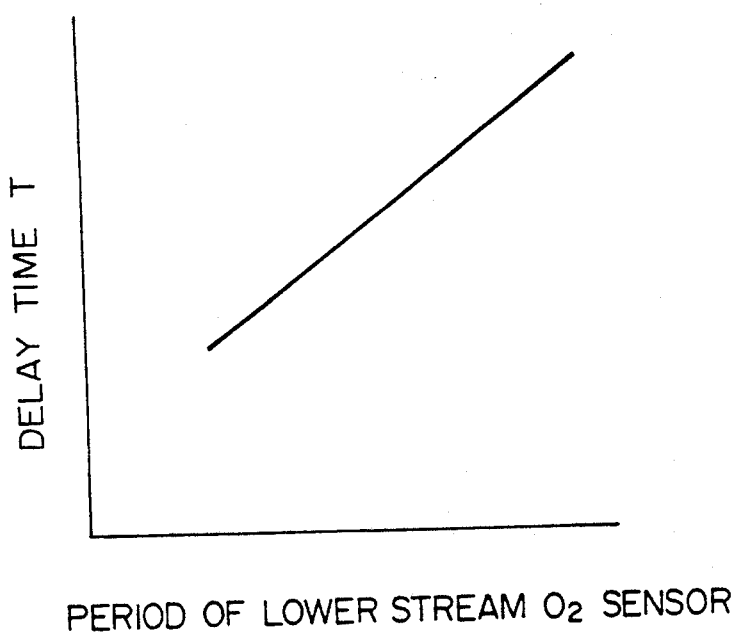
FIG. 14 is a graph which illustrates the relationship between the period of the lower stream $O_2$ sensor and the delay time.

By detecting the deterioration of the ternary catalyst 15 by forcibly changing the air/fuel ratio of the internal combustion engine 1 between rich and lean as described, the following effects can be obtained:

FIG. 14 is a graph which illustrates the period of the lower stream $O_2$ sensor 18 and the delay time T from the moment the output signal from the upper stream $O_2$ sensor 16 has been changed to the moment the output signal from the lower stream $O_2$ sensor 18 has been changed. As can be understood from FIG. 14, the change of the period of the lower stream $O_2$ sensor 18 will cause the delay time T to be changed. More specifically, if the period of the lower stream $O_2$ sensor 18 is lengthened, the delay time T is lengthened.

The period of the lower stream $O_2$ sensor 18 is changed when the internal combustion engine 1 is in the idle state because the sucked air quantity Q and the fuel injection quantity TAU have been changed due to the change of the electric load or the like, causing the delay time T to be also changed as shown in FIG. 14. That is, although the ternary catalyst 15 has not deteriorated, an erroneous discrimination is made that it has deteriorated because the delay time T has been changed to be longer than the predetermined value $\beta$.

However, the aforesaid problem can be prevented and therefore the deterioration of the ternary catalyst 15 can be accurately detected by forcibly changing the air/fuel ratio of the internal combustion engine 1 causing the change of the period of the lower stream $O_2$ sensor 18 to be prevented.

Furthermore, the counter CFAF enables the average air/fuel ratio correction coefficient FAFAV to be satisfactorily converged to the neighborhood of 1.0, casing the air/fuel ratio to be in the neighborhood of the theoretical air/fuel ratio of 14.7. Therefore, the value of the diagnosis air/fuel ratio correction coefficient FCAT can be assuredly changed relative to the theoretic air/fuel ratio 14.7. Hence, the deterioration of the catalyst can be detected more accurately.

Although the time in which the diagnosis air/fuel ratio correction coefficient FCAT is maintained at 1.1 is made longer than the time in which the same is maintained at 0.9 (4:1 according to this embodiment), the time in which the same is maintained at 1.1 and the time in which the same is maintained at 0.9 may be the same. On the contrary, the time in which the same is maintained at 0.9 may be longer than the time in which the same is maintained at 1.1.

If the fuel injection quantity TAU is forcibly always changed as described above, the driveability deteriorates because the output from the internal combustion engine 1 is changed. Therefore, the aforesaid change may be executed by the method according to the first embodiment only when it is discriminated that there is a fear the ternary catalyst 15 has deteriorated in place of always executing the aforesaid change.

In accordance with the present invention, the detection of deterioration of the catalyst is performed at the time of idling so as to compensate scattering of the response delay time of the upper and the lower stream oxygen sensors, as described in detail. Therefore an excellent effect ca be obtained in that the deterioration of the catalyst can be accurately detected.

Furthermore, the arrangement made in such a manner that the internal combustion engine is forcibly changed so as to cause the air/fuel ratio of the internal combustion engine to repeat the rich state and the lean state is able to prevent the undesirable change of the response delay time from the moment the output signal from the upper stream oxygen sensor has been changed to the moment the lower stream oxygen sensor is changed. Therefore, an excellent effect can be obtained in that the accuracy of detecting the deterioration of the catalyst can be improved.

In addition, the structure in which the catalyst is directly connected to the exhaust manifold enables the temperature of the catalyst to easily reach the activation level, causing the detection of the deterioration of the catalyst to be assuredly performed at the time of the idling operation.

Furthermore, the structure arranged in such a manner that the average air/fuel ratio correction coefficient is calculated and the air/fuel ratio of the mixed gas is, by the theoretical air/fuel ratio control means, made to be in the neighborhood of the theoretical air/fuel ratio by using the correction coefficient enables the mixed gas to be assuredly controlled to the neighborhood of the theoretical air/fuel ratio. When the execution of the detection of the deterioration of the catalyst is permitted at this time, the deterioration of the catalyst can be assuredly detected.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An apparatus for detecting deterioration of a catalyst disposed in an exhaust system of an internal combustion engine and acting to purify an exhaust gas, said apparatus for detecting deterioration of a catalyst comprising:

upper and lower stream oxygen sensors respectively disposed in the upper stream and the lower stream from said catalyst and acting to detect whether or not the air/fuel ratio of said internal combustion engine is rich or lean with respect to theoretical air/fuel ratio;

air/fuel ratio calculating means for calculating, in accordance with an output signal from said upper and/or lower stream oxygen sensors, an air/fuel ratio correction coefficient with which said air/fuel ratio is corrected so as to be in the neighborhood of said theoretical air/fuel ratio;

internal combustion engine control means for performing control by using said air/fuel ratio correction coefficient in such a manner that said air/fuel ratio is made to be said theoretical air/fuel ratio;

average air/fuel ratio correction coefficient calculating means for calculating an average air/fuel ratio correction coefficient of said air/fuel ratio correction coefficient when said air/fuel ratio is changed from a rich side to a lean side and said air/fuel ratio correction coefficient when said air/fuel ratio is changed from the leans side to the rich side;

catalyst deterioration detection means for discriminating the deterioration of said catalyst in accordance with an output signal from at least said lower stream oxygen sensor; and permission means for permitting said catalyst deterioration detection means to execute said detection if a fact that said internal combustion engine is in a predetermined operation state has been detected and if a fact that said air/fuel ratio has been converged to the neighborhood of said theoretical air/fuel ratio has been detected in accordance with the value of said average air/fuel ratio correction coefficient.

2. An apparatus for detecting deterioration of a catalyst according to claim 1 further comprising idle detection means for detecting whether or not said internal combustion engine is in the idle state, wherein
said predetermined operation state to be detected by said permission means includes a state where a fact that said internal combustion engine is in the idle state is discriminated by said idle detection means.

3. An apparatus for detecting deterioration of a catalyst according to claim 1, wherein said permission means includes means for detecting conversion of said air/fuel ratio to said theoretical air/fuel ratio when said average air/fuel ratio correction coefficient is in a predetermined range in the neighborhood of said theoretical air/fuel ratio.

4. An apparatus for detecting deterioration of a catalyst according to claim 1, wherein said permission means includes means for discriminating whether or not said average air/fuel ratio correction coefficient is included by said predetermined range in the neighborhood of said theoretical air/fuel ratio, and means for discriminating whether or not said state where said average air/fuel ratio is included by said predetermined range in the neighborhood of said theoretical air/fuel ratio has been continued for a predetermined period, said permission means detecting that said air/fuel ratio has been converged to said theoretical air/fuel ratio when said state where said average air/fuel ratio is included in said predetermined range in the neighborhood of said theoretical air/fuel ratio has been continued for a predetermined period.

5. An apparatus for detecting deterioration of a catalyst according to claim 1, wherein said catalyst deterioration detection means includes means for detecting a response delay time from a moment an output signal from said upper stream oxygen sensor has been changed to a moment an output signal from said lower stream oxygen sensor has been changed, said means for detecting a response delay time discriminating that said catalyst has deteriorated if said response delay time is smaller than a predetermined value.

6. An apparatus for detecting deterioration of a catalyst according to claim 5, wherein said response delay time is a time taken from a moment said air/fuel ratio sensor correction coefficient has been changed from the rich side to the lean side in a skip manner to a moment an output of said lower stream oxygen sensor traverses a predetermined comparison voltage from the rich side to the lean side and/or a time taken from a moment said air/fuel ratio sensor correction coefficient has been changed from the lean side to the rich side in a skip manner to a moment said output from said lower stream oxygen sensor traverses said predetermined comparison voltage from the lean side to the rich side.

7. An apparatus for detecting deterioration of a catalyst according to claim 1, wherein said exhaust system includes an exhaust manifold, and said catalyst is directly connected to said exhaust manifold.

8. An apparatus for detecting deterioration of a catalyst disposed in an exhaust system of an internal combustion engine and acting to purify an exhaust gas, said apparatus for detecting deterioration of a catalyst comprising:

upper and lower stream oxygen sensors respectively disposed in the upper stream and the lower stream from said catalyst and acting to detect whether or not the air/fuel ratio of said internal combustion engine is rich or lean with respect to a theoretical air/fuel ratio;

air/fuel ratio calculating means for calculating, in accordance with an output signal from said upper and/or lower stream oxygen sensors, an air/fuel ratio correction coefficient with which said air/fuel ratio us corrected so to be in the neighborhood of said theoretical air/fuel ratio;

internal engine control means for performing control by using said air/fuel ratio correction coefficient in such a manner that said air/fuel ratio is made to be said theoretical air/fuel ratio;

average air/fuel ratio correction coefficient calculating means for calculating an average air/fuel ratio correction coefficient of said air/fuel ratio correction coefficient when said air/fuel ratio is changed from a rich side to a lean side and said air/fuel ratio correction coefficient when said air/fuel ratio is changed from the lean side to the rich side;

forcible control means for forcibly controlling said air/fuel ratio of said internal combustion engine to forcibly repeat the rich state and the lean state at predetermined intervals;

catalyst deterioration detection means for detecting, during a forcible control performed by said forcible control mean, a response delay time from a moment an output signal from said upper stream oxygen sensor has been changed to a moment an output signal from said lower stream oxygen sensor has been changed, said catalyst deterioration detection means being arranged to discriminate that said catalyst has deteriorated if said response delay time is shorter than a predetermined value; and permission means for permitting said forcible control means to perform control if a fact that said internal combustion engine is in an idle state has been detected and a fact that said air/fuel ratio has been converged to the neighborhood of said theoretical air/fuel ratio has been detected in accordance with the value of said average air/fuel ratio correction coefficient.

9. An apparatus for detecting deterioration of a catalyst according to claim 8, wherein said permission means includes means for detection conversion of said air/fuel ratio to said theoretical air/fuel ratio when said average air/fuel ratio correction coefficient is in a predetermined range in the neighborhood of said theoretical air/fuel ratio.

10. An apparatus for detecting deterioration of a catalyst according to claim 8, wherein said permission means includes means for discriminating whether or not said average air/fuel ratio correction coefficient is included by said predetermined range in the neighborhood of said theoretical air/fuel ratio, and means for discriminating whether or not said state where said average air/fuel ratio is included by said predetermined range in the neighborhood of said theoretical air/fuel ratio has been continued for a predetermined period, said permission means detecting that said air/fuel ratio has been converged to said theoretical air/fuel ratio when said state where said average air/fuel ratio is included in said predetermined range in the neighborhood of said theoretical air/fuel ratio has been continued for a predetermined period.

11. An apparatus for detecting deterioration of a catalyst according to claim 8, wherein said response delay time is a time taken from a moment said air/fuel ratio sensor correction coefficient has been changed from the rich side to the lean side in a skip manner to a moment an output of said lower stream oxygen sensor traverses a predetermined comparison voltage from the rich side to the lean side and/or a time taken from a moment said air/fuel ratio sensor correction coefficient has been changed from the lean side to the rich side in a skip manner to a moment said output from said lower stream oxygen sensor traverses said predetermined comparison voltage from the lean side to the rich side.

12. An apparatus for detecting deterioration of a catalyst according to claim 8, wherein said exhaust system includes an exhaust manifold, and said catalyst is directly connected to said exhaust manifold.

* * * * *